(12) United States Patent  (10) Patent No.: US 8,445,156 B2
Weingaertner et al.  (45) Date of Patent: May 21, 2013

(54) MULTI-STREAM HEAT EXCHANGER FOR A FUEL CELL SYSTEM

(75) Inventors: David Weingaertner, Sunnyvale, CA (US); Martin Perry, Mountain View, CA (US); Swaminathan Venkataraman, Cupertino, CA (US); Vlad Kalika, San Jose, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 176 days.

(21) Appl. No.: 12/873,935

(22) Filed: Sep. 1, 2010

(65) Prior Publication Data

US 2011/0053027 A1  Mar. 3, 2011

Related U.S. Application Data

(60) Provisional application No. 61/272,227, filed on Sep. 2, 2009.

(51) Int. Cl.
*H01M 8/04* (2006.01)

(52) U.S. Cl.
USPC ............ 429/440; 429/441; 429/428; 429/433

(58) Field of Classification Search
USPC .......................... 429/408, 428, 433, 440, 441
See application file for complete search history.

(56) References Cited

U.S. PATENT DOCUMENTS

| | | | |
|---|---|---|---|
| 3,488,266 A | 1/1970 | French | |
| 4,041,210 A | 8/1977 | Van Dine | |
| 4,182,795 A | 1/1980 | Baker et al. | |
| 4,532,192 A | 7/1985 | Baker et al. | |
| 4,792,502 A | 12/1988 | Trocciola et al. | |
| 4,898,792 A | 2/1990 | Singh et al. | |
| 4,917,971 A | 4/1990 | Farooque | |
| 4,983,471 A | 1/1991 | Reichner et al. | |
| 5,034,287 A | 7/1991 | Kunz | |
| 5,047,299 A | 9/1991 | Shockling | |
| 5,084,362 A | 1/1992 | Farooque | |
| 5,143,800 A | 9/1992 | George et al. | |

(Continued)

FOREIGN PATENT DOCUMENTS

| | | |
|---|---|---|
| JP | 203229151 A | 8/2003 |
| JP | 2004-247290 | 9/2004 |

(Continued)

OTHER PUBLICATIONS

International Search Report issued in PCT Application PCT/US2010/047540, mailed on May 30, 2011.

(Continued)

*Primary Examiner* — Edu E Enin-Okut
(74) *Attorney, Agent, or Firm* — The Marbury Law Group PLLC

(57) ABSTRACT

A multi-stream heat exchanger includes at least one air preheater section, at least one cathode recuperator section, and at least one anode recuperator section, wherein each section is a plate type heat exchanger having two major surfaces and a plurality of edge surfaces, a plurality of risers through at least some of the plates, and a plurality of flow paths located between plates. The cathode recuperator section is located adjacent to a first edge surface of the anode recuperator, and the air preheater section is located adjacent to a second edge surface of the anode recuperator section.

6 Claims, 23 Drawing Sheets

U.S. PATENT DOCUMENTS

| | | | |
|---|---|---|---|
| 5,169,730 | A | 12/1992 | Reichner et al. |
| 5,170,124 | A | 12/1992 | Blair et al. |
| 5,302,470 | A | 4/1994 | Okada et al. |
| 5,441,821 | A | 8/1995 | Merritt et al. |
| 5,498,487 | A | 3/1996 | Ruka et al. |
| 5,501,914 | A | 3/1996 | Satake et al. |
| 5,505,824 | A | 4/1996 | McElroy |
| 5,527,631 | A | 6/1996 | Singh et al. |
| 5,573,867 | A | 11/1996 | Zafred et al. |
| 5,601,937 | A | 2/1997 | Isenberg |
| 5,686,196 | A | 11/1997 | Singh et al. |
| 5,733,675 | A | 3/1998 | Dederer et al. |
| 5,741,605 | A | 4/1998 | Gillett et al. |
| 5,955,039 | A | 9/1999 | Dowdy |
| 6,013,385 | A | 1/2000 | DuBose |
| 6,051,125 | A | 4/2000 | Pham et al. |
| 6,106,964 | A | 8/2000 | Voss et al. |
| 6,280,865 | B1 | 8/2001 | Eisman et al. |
| 6,329,090 | B1 | 12/2001 | McElroy et al. |
| 6,348,278 | B1 | 2/2002 | LaPierre et al. |
| 6,403,245 | B1 | 6/2002 | Hunt |
| 6,436,562 | B1 | 8/2002 | DuBose |
| 6,451,466 | B1 | 9/2002 | Grasso et al. |
| 6,531,243 | B2 | 3/2003 | Thom |
| 6,623,880 | B1 | 9/2003 | Geisbrecht et al. |
| 6,655,150 | B1 | 12/2003 | Asen et al. |
| 6,821,663 | B2 | 11/2004 | McElroy et al. |
| 6,924,053 | B2 | 8/2005 | McElroy |
| 7,067,208 | B2 | 6/2006 | Gottmann et al. |
| 7,153,599 | B2 * | 12/2006 | Bunker et al. ............... 429/415 |
| 7,482,078 | B2 | 1/2009 | Sridhar et al. |
| 7,705,490 | B2 | 4/2010 | Srinivasan et al. |
| 7,878,280 | B2 | 2/2011 | Sridhar et al. |
| 7,974,106 | B2 | 7/2011 | Gurunathan et al. |
| 8,101,307 | B2 | 1/2012 | McElroy et al. |
| 2001/0049035 | A1 | 12/2001 | Haltiner, Jr. et al. |
| 2001/0049039 | A1 | 12/2001 | Haltiner, Jr. et al. |
| 2002/0015867 | A1 | 2/2002 | Cargnelli et al. |
| 2002/0028362 | A1 | 3/2002 | Prediger et al. |
| 2002/0058175 | A1 | 5/2002 | Ruhl |
| 2002/0106544 | A1 | 8/2002 | Noetzel et al. |
| 2003/0157386 | A1 | 8/2003 | Gottmann |
| 2003/0162067 | A1 | 8/2003 | McElroy |
| 2003/0196893 | A1 | 10/2003 | McElroy |
| 2003/0205641 | A1 | 11/2003 | McElroy |
| 2004/0018144 | A1 | 1/2004 | Briscoe |
| 2004/0081859 | A1 | 4/2004 | McElroy et al. |
| 2004/0096713 | A1 | 5/2004 | Ballantine et al. |
| 2004/0142215 | A1 | 7/2004 | Barbir et al. |
| 2004/0191597 | A1 | 9/2004 | McElroy |
| 2004/0191598 | A1 | 9/2004 | Gottmann et al. |
| 2004/0202914 | A1 | 10/2004 | Sridhar et al. |
| 2004/0224193 | A1 | 11/2004 | Mitlitsky et al. |
| 2005/0048334 | A1 | 3/2005 | Sridhar et al. |
| 2005/0053814 | A1 | 3/2005 | Imamura et al. |
| 2005/0106429 | A1 | 5/2005 | Keefer |
| 2005/0164051 | A1 | 7/2005 | Venkataraman et al. |
| 2006/0083964 | A1 | 4/2006 | Edlinger et al. |
| 2006/0115393 | A1 | 6/2006 | Reinke et al. |
| 2006/0251934 | A1 | 11/2006 | Valensa et al. |
| 2007/0017367 | A1 | 1/2007 | McElroy et al. |
| 2007/0017368 | A1 | 1/2007 | Levan et al. |
| 2007/0017369 | A1 | 1/2007 | LeVan et al. |
| 2007/0178338 | A1 | 8/2007 | McElroy et al. |
| 2008/0038622 | A1 * | 2/2008 | Valensa et al. ............... 429/38 |
| 2009/0042068 | A1 | 2/2009 | Weingaertner et al. |
| 2009/0208784 | A1 * | 8/2009 | Perry et al. ............... 429/13 |
| 2010/0239924 | A1 | 9/2010 | McElroy et al. |

FOREIGN PATENT DOCUMENTS

| | | |
|---|---|---|
| WO | WO03/019707 A1 | 3/2003 |
| WO | WO2004/013258 A1 | 2/2004 |
| WO | WO2004/076017 A2 | 9/2004 |
| WO | WO2004/093214 A2 | 10/2004 |
| WO | WO2004/095618 A2 | 11/2004 |

OTHER PUBLICATIONS

U.S. Appl. No. 11/656,006, filed Jan. 22, 2007, entitled "Modular Fuel Cell System."

International Preliminary Report on Patentability issued in PCT Application PCT/US2010/047540, mailed on Mar. 15, 2012.

"Type BPL Granular Carbon", Calgon Product Bulletin, Calgon Corporation, Activated Carbon Division, 2 pgs.

Berlier, Karl et al., "Adsorption of $CO_2$ on Microporous Materials. 1. On Activated Carbon and Silica Gel", J. Chem. Eng. Data, 1997, vol. 42, pp. 533-537.

EG & G, Parsons, Inc., SAIC. Fuel Cell Handbook. $5^{th}$ Edition. USDOE. Oct. 2000. 9-1—9-4; 9-12—9-14.

LeVan, M. Douglas et al., "Adsorption and Ion Exchange", Perry's Chemical Engineers' Handbook ($7^{th}$ Edition), 1997, 66 pgs.

LeVan, M. Douglas et al., "Fixed-Bed Adsorption of Gases: Effect of Velocity Variations on Transition Types", AIChE Journal, vol. 34, No. 6, Jun. 1988, pp. 996-1005.

Manchado, M. Cabrejas et al., "Adsorption of $H^2$, $O_2$, CO, and $CO_2$ on a $_\gamma$-Alumina: Volumetric and Calorimetric Studies", Langmuir, vol. 10, 1994, pp. 685-691.

Olivier, Marie-Georges et al., "Adsorption of Light Hyrdocarbons and Carbon Dioxide on Silica Gel", J. Chem. Eng. Data, 1997, vol. 42, pp. 230-233.

Qi, Nan et al., "Adsorption equilibrium modeling for water on activated carbons", Carbon, vol. 43, 2005, pp. 2258-2263.

Rudisill, Edgar N. et al., "Coadsorption of Hydrocarbons and Water on BPL Activated Carbon", Ind. Eng. Chem. Res., 1992, vol. 31, pp. 1122-1130.

Sward, Brian K. et al., "Simple Flow-Through Apparatus for Measurement of Mass Transfer Rates in Adsorbent Particles by Frequency Response", Fundamentals of Adsorption, K. Kaneko et al., eds., vol. 7, 2002, pp. 29-36. Published by IK International of Japan.

Sward, Brian K. et al., "Frequency Response Method for Measuring Mass Transfer Rates in Adsorbents via Pressure Perturbation", Adsorption, vol. 9, 2003, pp. 37-54.

Walton, Krista S. et al., "A Novel Adsorption Cycle for $CO_2$ Recovery: Experimental and Theoretical Investigations of a Temperature Swing Compression Process", Revised Manuscript, submitted in 1995 to Separation Science & Technology, 30 pgs.

Yang, Ralph T., "Adsorbents: Fundamentals and Applications", 2003, 4 pgs.

Yong, Zou et al., "Adsorption of Carbon Dioxide on Basic Alumina at High Temperatures", J. Chem. Eng. Data, 2000, vol. 45, pp. 1093-1095.

Yong, Zou et al, "Adsorption of carbon dioxide at high temperature—a review", Separation and Purification Technology, vol. 26, 2002, pp. 195-205.

Supplemental European Search Report and European Search Opinion, EP Application No. 06800263, Oct. 16, 2009, 11pgs.

Notification of Reasons of Refusal issued in Japanese Patent Application No. 2008-524022, Jan. 24, 2012.

\* cited by examiner

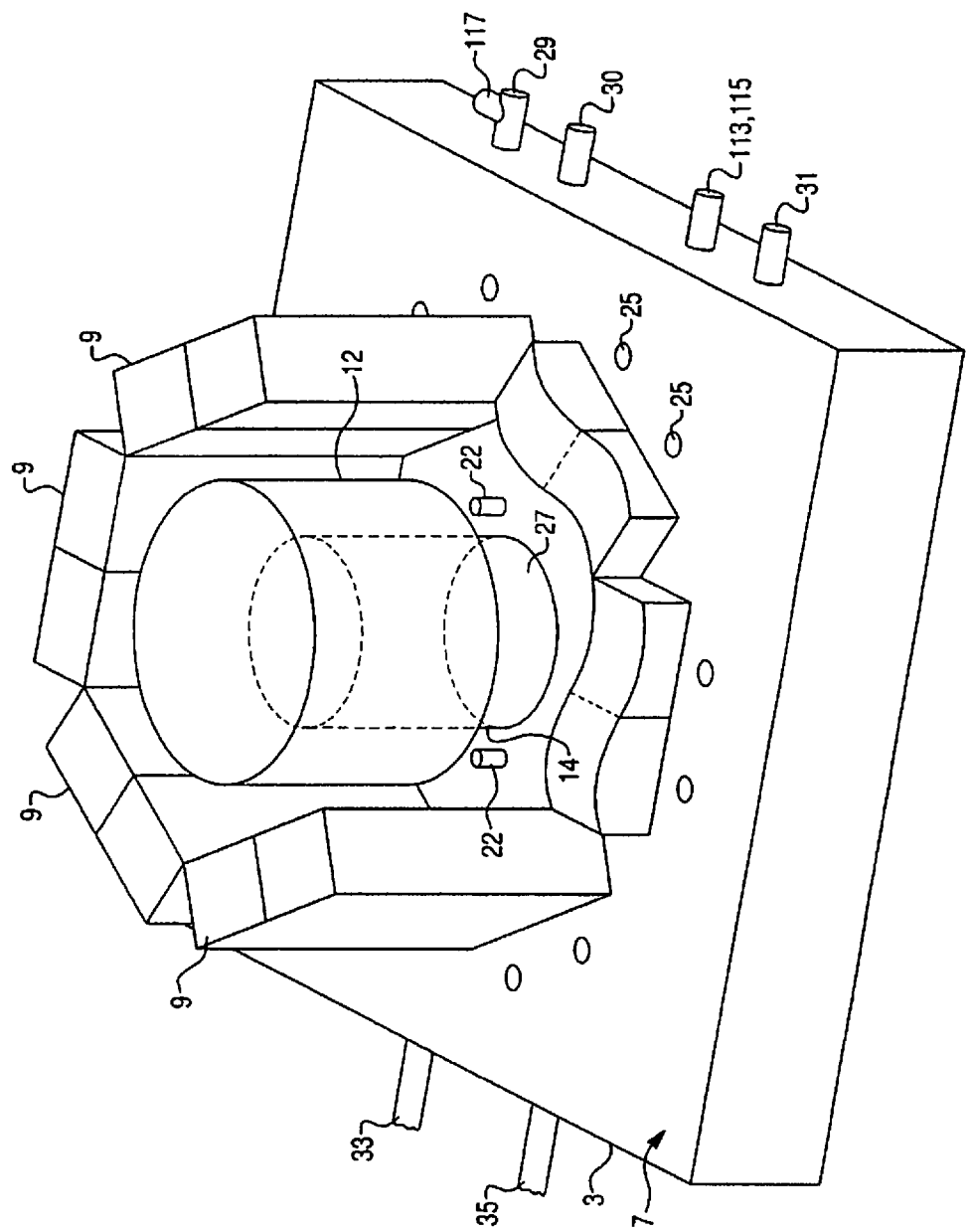

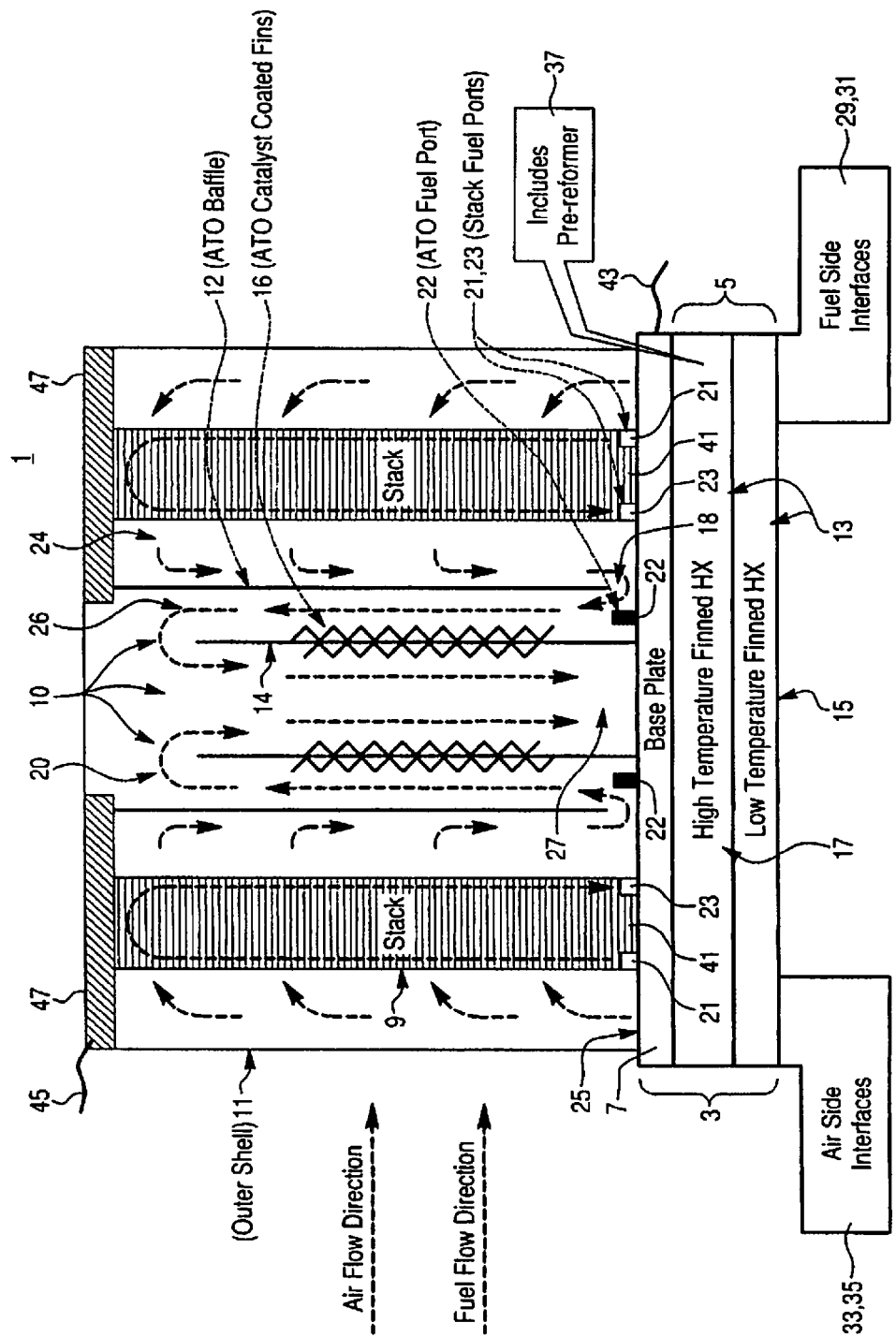

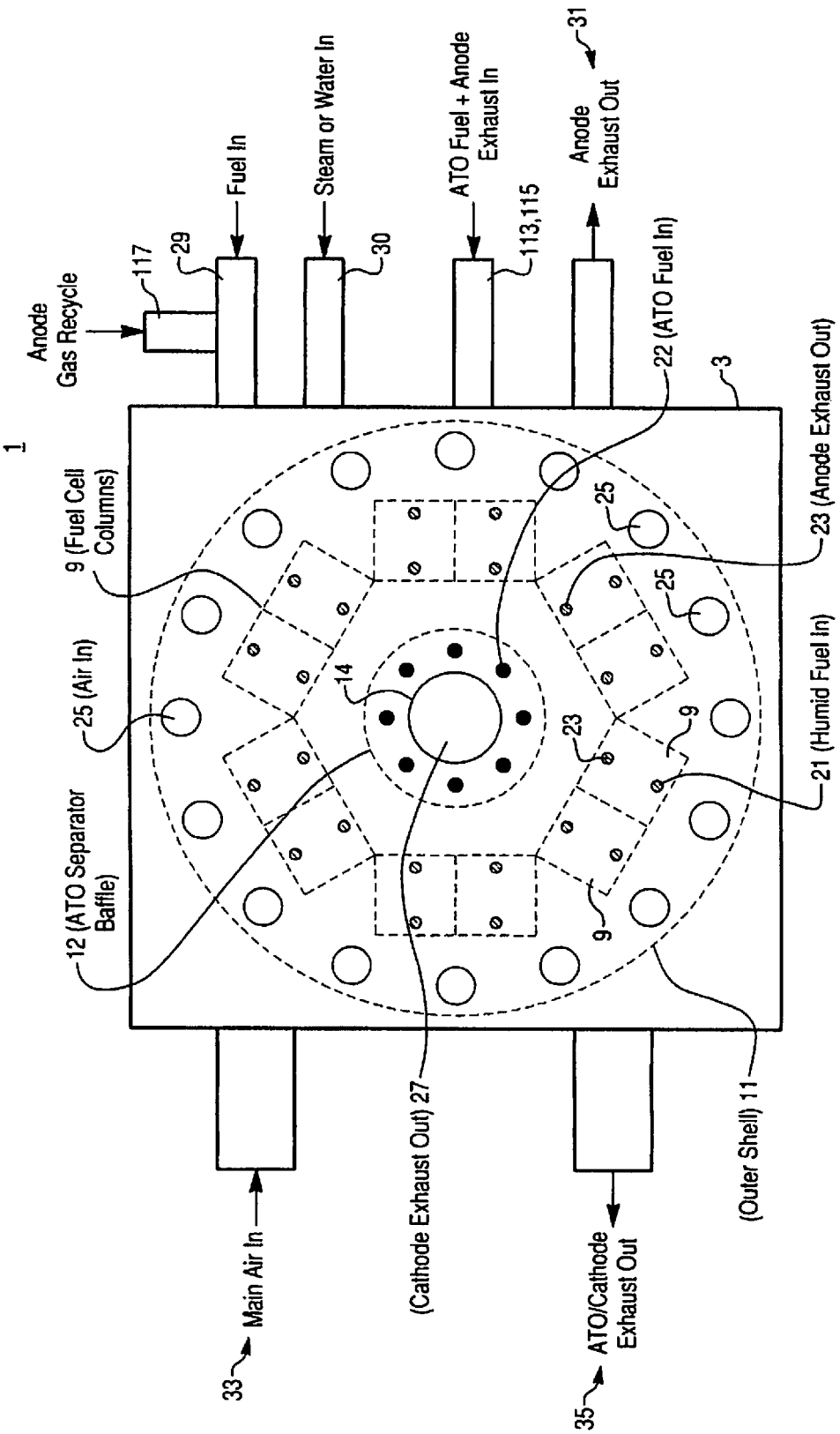

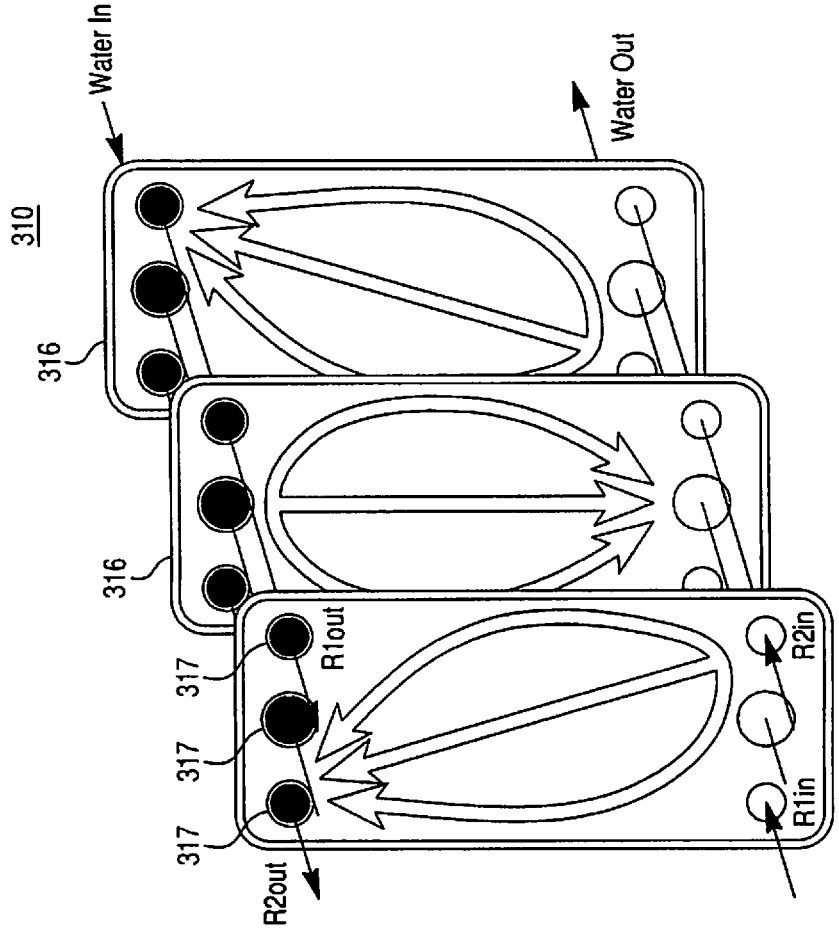

MULTI-STREAM HEAT EXCHANGER FOR A FUEL CELL SYSTEM

CROSS-REFERENCE TO OTHER APPLICATIONS

This application is based upon and claims priority to U.S. provisional application 61/272,227, filed Sep. 2, 2009. The 61/272,227 application is hereby incorporated by reference in its entirety.

BACKGROUND OF THE INVENTION

The present invention relates generally to the field of fuel cell systems and more particularly to a fuel cell system containing a multi-stream heat exchanger and method of operating same.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

BRIEF DESCRIPTION OF THE DRAWINGS

FIG. 1A is a three dimensional cut away view of a fuel cell module of an embodiment of the invention with a shell removed. FIG. 1B is a schematic side cross sectional view of the module of FIG. 1A. FIG. 1C is a top view of the module of FIG. 1A.

FIGS. 6 and 7 are three dimensional cut-away views of two types of multi-stream plate heat exchangers that may be used in embodiments of the present invention.

DETAILED DESCRIPTION OF THE EMBODIMENTS

Figure 1D:
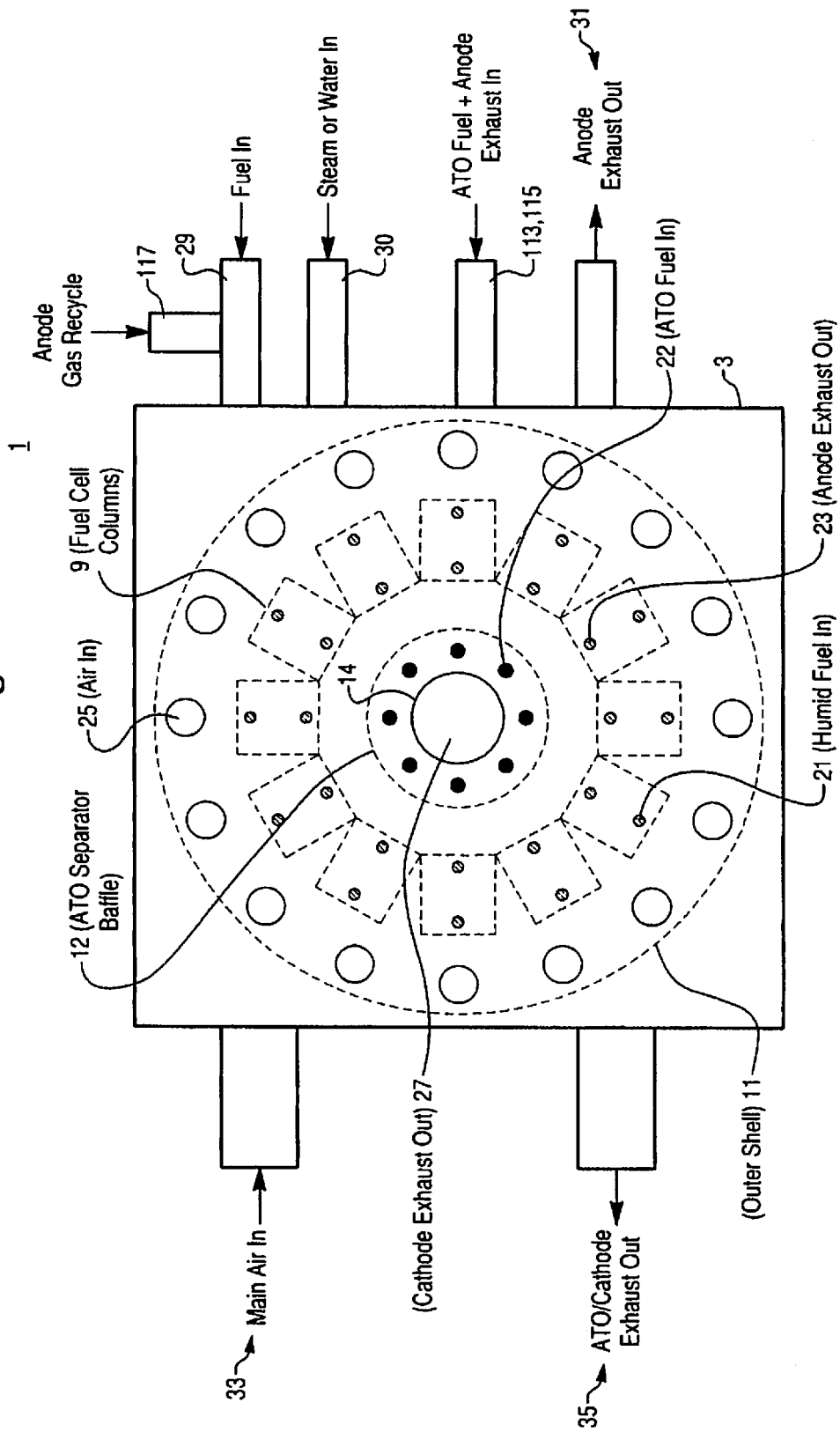
FIGS. 1D and 1E are top views of the module according to alternative embodiments of the invention.

The first embodiment of the invention provides a fuel cell stack module 1 which is illustrated in FIGS. 1A, 1B and 1C. The module 1 contains a base 3, which comprises a chamber 5 and a base plate 7 above the chamber 5 which provides an upper surface of the base 3. The base 3 may have a cylindrical shape, with a flat upper surface and a circular cross section, as shown in FIGS. 1A and 1C. However, the base 3 may have any other suitable shape, such as a square, rectangular, polygonal, oval or irregular cross section. The base plate 7 may comprise a separate component which is attached to the chamber 5 or the base 3 may comprise a unitary component in which the chamber 5 comprises its interior volume and the base plate 7 comprises its upper surface. As will be described below, one or more heat exchangers 13 can be located inside the chamber 5.

As shown in FIGS. 1A-1C, each fuel cell stack module 1 includes at least one fuel cell stack column 9 (which will be referred herein as a "stack" for simplicity) and an outer shell 11. The shell 11 can have any suitable shape, such as a dome, a covered cylinder (including a cylinder with a flat top cover or a cylinder with a dome shaped cover (which helps to reduce thermal stress)), a cube or a three dimensional rectangle, for covering the stack(s) 9. The shell 11 is shown in FIG. 1B and its location from the top is shown as a dashed line in FIGS. 1C-1E. For example, two or more stacks 9, such as four to twelve stacks 9 may be located under the shell 11. The stacks 9 are preferably stacked vertically under each shell 11. If desired, the vertically stacked fuel cell stacks 9 may be provided in a cascade configuration, where the fuel exhaust stream from one stack is used as the inlet fuel stream for an adjacent stack, such as, for example, a cascade to and from modules in the same column.

The stacks 9 may comprise any suitable fuel cells. For example, the fuel cells may comprise solid oxide fuel cells having a ceramic oxide electrolyte. Other fuel cell types, such as PEM, molten carbonate, phosphoric acid, etc. may also be used. The stacks 9 may comprise externally and/or internally manifolded stacks. For example, the stacks may be internally manifolded for fuel and air with fuel and air risers extending through openings in the fuel cell layers and/or in the interconnect plates between the fuel cells. Alternatively, as shown in FIGS. 1B and 1C, the fuel cells may be internally manifolded for fuel and externally manifolded for air, where only the fuel inlet and exhaust risers extend through openings in the fuel cell layers and/or in the interconnect plates between the fuel cells. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration. Each stack 9 may have one fuel inlet and outlet, as will be described in more detail below. However, if desired, each stack 9 may have several fuel inlets and outlets along its height. In that case, each stack 9 contains plural sub-stack units (i.e., each stack column 9 contains separate sub-stacks).

Figure 1E:
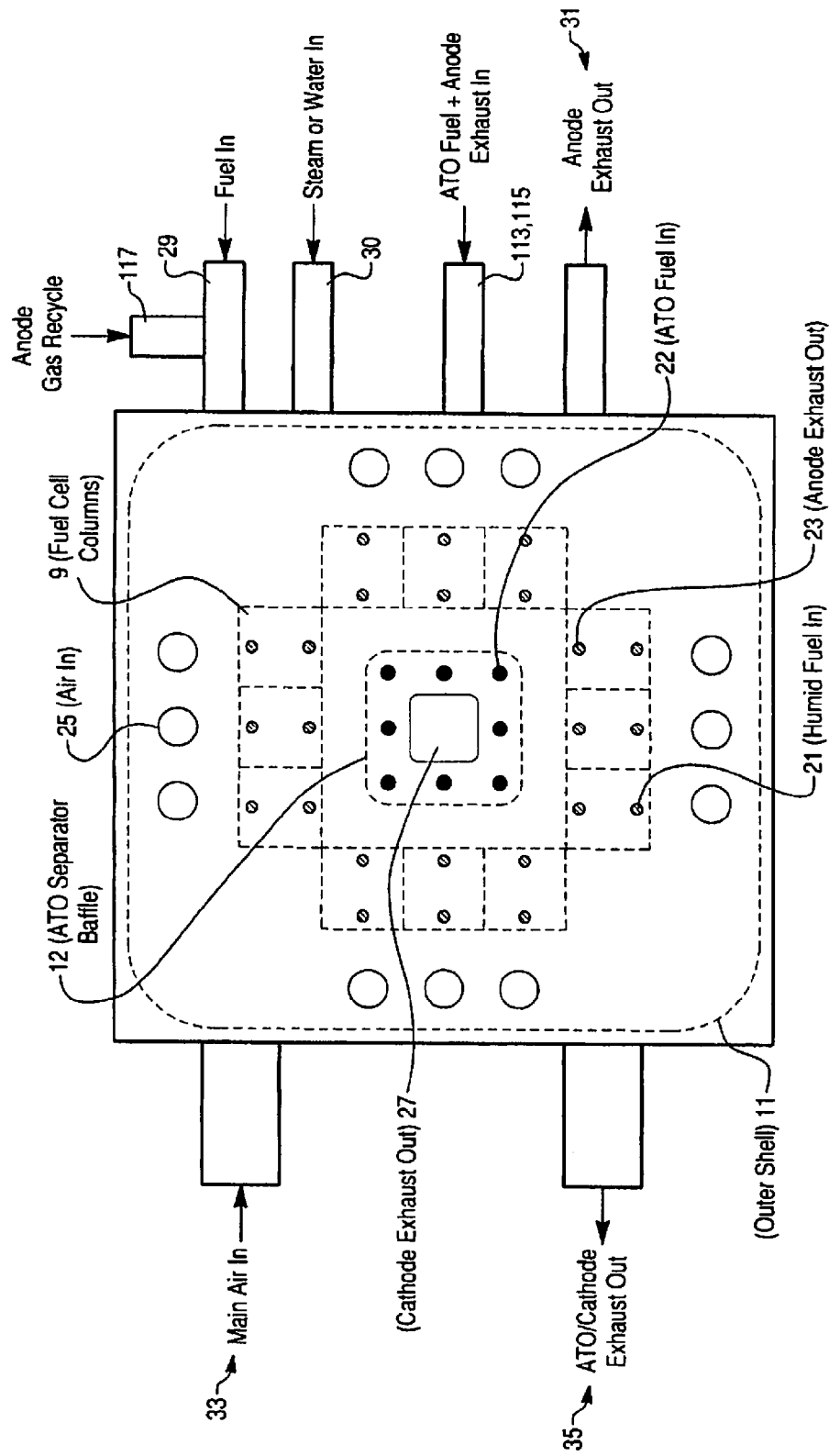

As shown in FIGS. 1C, 1D and 1E, the plurality of angularly spaced fuel cell stacks 9 are arranged to form an annular array (i.e., a ring-shaped structure) about a central axis of the module. It should be noted that the term "annular array" is not limited to an array having a circular perimeter, which is shown in FIG. 1D. For example, the array may have a hexagonal or rectangular (square) perimeter, as shown in FIGS. 1C and 1E, respectively, or elliptical perimeter, which would provide a narrower system, which could then more easily fit in a standard shipping container. The fuel cell stacks 9 have a stacking direction extending parallel to the central axis of the module 1. Preferably, but not necessarily each of the stacks 9 has a rectangular cross section. The stacks 9 are isolated from each other using ceramic or other insulating spacers. While stacks 9 arranged as an annular array are preferred, any other stack 9 layout which would fit within the shell 11 may be used, such as an arc layout (i.e., a portion of a ring) or a grid layout (e.g. 20 stacks, 4 rows by 5 columns) for example.

The shell 11 may have any suitable configuration. For example, the shell 11 may have a cylindrical configuration. However, the shell 11 may have a polygonal or oval horizontal cross section and/or it may have a tapered rather than flat upper surface. The shell may be made of any suitable thermally insulating or thermally conductive material, such as metal, ceramic, etc.

The stack(s) 9 and the shell 11 are removably positioned or removably connected to an upper surface (such as the base plate 7) of the base 3. Preferably, each fuel cell stack 9 and the shell 11 are separately removably connected to the upper surface 7 of the base 3. In this case, the shell 11 may be easily removed from the upper surface 7 of the base 3 without removing the stack(s) 9 under the shell 11. Alternatively, if the shell 11 contains a door or a hatch, then the stack(s) 9 under the shell 11 may be easily removed through the door or hatch without removing the shell 11. In an alternative embodiment, the shell 11 and/or the stacks 9 may be permanently connected to the base 3. For example, the shell 11 may be welded to the base 3.

The term "removably connected" means that the stack(s) 9 and/or the shell 11 are connected to the upper surface 7 of the base 3 in such a way as to be easily removed for repair or servicing. In other words, "removably connected" is an opposite of "permanently connected". For example, the stacks 9 and/or the shell 11 are removably connected to the upper surface 7 of the base 3 by at least one of a snap fit connection, a tension fit connection, a fastening connection or a slide rail connection. An example of a snap fit connection is a bayonet type connection in which one or more prongs which hold a component in place by hooking into an opening are pressed inward or outward to unhook them from the opening. An example of a tension fit connection is where a component, such as a stack 9 or a shell 11, is pressed into an opening or groove in the surface 7 of the base 3 which has the about same size as the cross section of the stack 9 or the shell 11 such that tension holds the stack or the shell in the opening or groove. An example of a fastening connection is connection by a fastener, such as a bolt or a clip, which can be removed by service personnel. An example of a slide rail connection is a drawer or dove tail type connection, such as a groove in the upper surface 7 of the base 3 into which a protrusion in the stack 9 can be slid into, or a groove in the bottom stack 9 plate into which a protrusion in the upper surface 7 of the base 3 can be slid into. An example of a permanent connection is a welded connection, such as where the shell 11 is welded to the surface 7 of the base.

The stack(s) 9 and the shell 11 can be removably connected using a different type of connection from each other. Furthermore, in an alternative aspect of the invention, the shell 11 may be removably connected to the upper surface 7 of the base 3, while the stack(s) 9 may be non-removably connected to the same surface 7.

Preferably, at least one heat exchanger is located in the interior volume 5 of the base 3. For example, as shown in FIG. 1B, a multi-stream heat exchanger 13 is located in the interior volume 5 of the base 3.

The heat exchanger 13 may comprise a low temperature portion 15 and a high temperature portion 17. The low temperature portion 15 may be made of less expensive, low temperature materials, such as stainless steel, which are not tolerant of very high temperatures. The high temperature portion 17 may be made of more expensive, high temperature materials, such as Inconel or other nickel alloys, which are high temperature tolerant. This configuration decreases the cost of the heat exchanger 13. If desired, one or more intermediate temperature portions made of intermediate temperature tolerant materials may also be provided in the heat exchanger 13.

Any type of heat exchanger may be used, such as a finned plate type of heat exchanger. If desired, the high temperature portion 17 of the heat exchanger may act as a complete or partial external reformer 37 for the fuel cell stacks 9. In this case, all or a portion of fins of the passages of the heat exchanger 13 which carry the fuel inlet stream are coated with a fuel reformation catalyst, such as nickel and/or rhodium for a hydrocarbon fuel, such as natural gas or methane. The external reformer 37 may act as a pre-reformer if the stacks 9 contain fuel cells of the internal reformation type (i.e., fuel cells contain one or more internal surfaces or coatings that are catalytically active for reforming. The catalyst may comprise a catalyst coating, or using nickel as part of the metal construction of the fuel cell housing and support). Alternatively, for complete internal reformation type fuel cells or for fuel cell systems which operate on hydrogen fuel (which does not require reformation), the reformer 37 may be omitted. For external reformation type fuel cells (i.e., fuel cells which do not contain a fuel reformation catalyst or fuel cells in which the catalyst is part of the metal structure of the cell housing, the catalyst may still be present, but not designed to be used as a catalyst, usually due to degradation of the cells), the reformer 37 acts as the main fuel reformer. In an alternative embodiment of the invention, the reformer 37 is not integrated into the heat exchanger but is located in a separate location in the hot box of the module 1. In another alternative embodiment of the invention, separate fuel and air heat exchangers provide heat from the fuel and air exhaust streams, respectively, to fuel and air inlet streams, respectively, as will be described with respect to FIG. 2B below.

As shown in FIGS. 1A-1E, an anode tail gas oxidizer (ATO) 10 is preferably located over the central portion of the base 3 (i.e., on the base plate 7) in a heat transfer relationship with the stacks 9 (i.e., such that heat is transferred by convection and/or radiation between the ATO 10 and the stacks 9). Preferably but not necessarily, the ATO 10 is located in the middle of the annular stack 9 array such that the ATO 10 is surrounded by the stacks 9. However, for stack 9 layouts that do not form a complete ring, such as grid or arc layouts, the ATO 10 may be located adjacent to the stacks or may be partially surrounded by the stacks 9. In an annular or arc array, the ATO is exposed to the radially inward faces of the fuel cell stacks to receive the cathode exhaust stream therefrom. An ATO is a chamber in which the anode (fuel) exhaust from the stacks is oxidized by reaction with an oxidizer stream, such as a reaction of the stack anode exhaust stream with the stack cathode (air) exhaust stream. The ATO chamber walls may be coated with a suitable oxidation reaction promoting catalyst, such as palladium on a support member or material. The oxidation reaction releases heat which can be used to heat the stacks 9 and/or to provide a hot ATO exhaust stream into the heat exchanger 13. As shown in FIG. 1B, the ATO 10 may comprise an ATO exterior baffle 12, which is a cylindrical or other suitably shaped wall which is attached to the top of the outer shell 11, but which contains an opening 18 adjacent to the base plate 7 of the base 3 through which the stack cathode (air) exhaust stream passes. The ATO 10 may also comprise an interior baffle 14 which is a cylindrical or other suitably shaped wall which is attached to the base plate 7 but which contains an opening 20 adjacent to the upper surface of the shell 11 through which the anode and cathode exhaust streams pass. Alternatively, the interior baffle 14 may extend to the top of the shell 11 and only have perforations rather than the opening 20 near the top. The interior baffle 14 is preferably located inside the exterior baffle 12. The interior baffle 14 may also be considered as an annulus for the ATO/cathode exhaust conduit 27. The interior and/or exterior surface of the interior baffle 14 and/or the interior surface of the exterior baffle 12 may be covered with the oxidation promoting catalyst material, which may be coated on optional fins or corrugations 16 located on the surface(s) of the baffle(s) 12, 14. For example, while FIG. 1B shows a two pass ATO (up flow, then down flow), the ATO 10 may have more passes, and the interior baffle 14 may contain perforations. In an alternative embodiment, the ATO may comprise a single pass ATO. For example, in this embodiment, the ATO baffle 12 is eliminated, and the ATO catalyst coated fins 16 on the outside of the interior baffle 14 are optional. In another alternative embodiment, a portion or all off the ATO catalyst coated fins on either side of the interior baffle 14 can be replaced with a catalyst coating directly on all or a portion of the interior baffle 14. If desired, another cylinder is placed inside interior baffle 14 (i.e., cylindrical baffle 12 may be moved inside cylindrical baffle 14). The exhaust flows from the stacks 9 upwards, and over the baffle 14 to enter the ATO.

One or more ATO fuel inlet conduit(s) 22 may be located in the base plate 7 between the exterior 12 and the interior 14 ATO baffles. Alternatively, the ATO fuel inlet conduit may be ducted from the base plate to the top of the ATO. The ATO fuel inlet conduits 22 provide the ATO fuel inlet stream between the baffles 12 and 14 where the fuel inlet stream mixes and reacts with the ATO air inlet stream. The ATO fuel inlet stream may comprise one or both of i) a separate fuel inlet stream from the stack fuel inlet stream, such as a natural gas inlet stream, and/or ii) at least a portion of the stack anode exhaust stream that has passed through the heat exchanger 13. Alternatively, the ATO fuel inlet stream may also partially or fully bypass the heat exchanger to keep the inlet temperature limited. The ATO air inlet stream may comprise the stack cathode exhaust stream which flows from the stacks 9 to the ATO 10 under the outer baffle 12, as shown in FIG. 1B, or a fresh air inlet stream (which may or may not be mixed with either of the ATO fuel inlet streams), or a combination of fresh air inlet stream and stack cathode exhaust. The ATO fuel inlet stream is oxidized by the ATO air inlet stream (such as the stack cathode exhaust stream or a mixture of the cathode exhaust and the optional fresh air inlet streams). The ATO exhaust stream (oxidized fuel) is removed from the ATO 10 through the central ATO exhaust conduit 27 located in the base plate 7 in the middle of the interior baffle 14. In the single pass ATO embodiment described above, the central ATO exhaust conduit 27 may also contain an inner cylinder to force the ATO flow through an annulus.

As shown in FIGS. 1B and 1C, the base 3 also contains a plurality of fuel inlets 21 which provide a fuel inlet stream to the fuel cell stacks 9, a plurality of fuel exhaust openings 23 which remove the fuel exhaust stream from the stacks 9, a plurality of peripheral air inlets 25 which provide an air (or other oxidizer) inlet stream to the stacks 9, and a central ATO exhaust conduit 27 which removes the air/ATO exhaust stream from the stacks 9. Inlets 21 and 25 and exhaust opening 23 may comprise holes in the base plate 7 and/or pipes which extend through the base plate 7. Thus, in one embodiment of the invention, the stacks 9 are externally manifolded for air and internally manifolded for fuel. The plurality of angularly spaced fuel cell stacks 9 are arranged to form an annular array about a central axis of the module inside the ring-shaped arrangement of the stack air inlets 25.

The module 1 operates as follows. The fuel and air inlet streams are heated in the heat exchanger 13 by the anode exhaust and/or the ATO exhaust streams, as will be described in more detail below. The fuel inlet stream is provided upwards and internally into the stacks 9 through the respective fuel inlets 21 for each stack from below. The anode (fuel) exhaust stream from the stacks 9 is provided downwards and internally through the stacks and is removed through the respective fuel exhaust openings 23 into the heat exchanger 13 located in the base 3.

As shown by the arrows in FIG. 1B, the stack air inlet stream is provided under the shell 11 through the base plate 7 through inlets 25 arranged in an annular or ring shaped configuration in the periphery of the base 3. The air inlet stream flows through the cells of the stacks 9. The stacks 9 and ceramic spacers (which are not shown for clarity) prevent the air inlet stream from flowing directly into the interior space 24 without flowing though the stacks 9 first. The cathode (air) exhaust stream exits the stacks 9 into the space 24 between the stacks 9 and the outer ATO baffle 12. The cathode exhaust stream flows through opening(s) 18 below the outer ATO baffle 12 into the space 26 between the outer and inner ATO baffles 12, 14. The stack cathode exhaust stream mixes and reacts with the ATO fuel inlet stream provided from conduits 20 in space 26. The oxidation reaction provides heat to the stacks 9 via radiation and/or convection during system startup and during steady state operation to provide sufficient heat for internal fuel reformation reaction in the stacks 9. The ATO exhaust (oxidized fuel) is then exhausted upwards through opening(s) 20 above the inner baffle 14 and downward through the central ATO exhaust conduit 27 into the heat exchanger 13 located in the chamber 5 below the base plate 7. While a specific ATO configuration is shown in FIGS. 1B and 1C, it should be understood that other configurations may also be used, such as configurations where the fluid streams follow a linear or tortuous path adjacent to oxidation catalyst coated members. For example, a cylinder may be located inside baffle 14 to limit the volume (and hence the amount) of fins and catalyst.

As shown in FIGS. 1A-1C, a fuel inlet line 29 is connected to a first inlet of the fuel heat exchanger 13. The plurality of fuel inlet conduits 21 are fluidly connected to a first outlet of the heat exchanger 13. The term "fluidly connected" means either directly connected or indirectly connected such that the fuel inlet stream flows from the heat exchanger 13 through one or more other components until it reaches each fuel inlet conduit 21. The plurality of fuel exhaust openings 23 are fluidly connected to a second inlet of the heat exchanger 13. A fuel exhaust line 31 is connected to a second outlet of the heat exchanger 13. An air inlet line 33 is connected to a third inlet of the heat exchanger 13. If desired, one or more optional air by-pass conduits may be provided which diverts some or all of the air inlet stream from the air inlet line 33 around the heat exchanger 13, or around a portion of the heat exchanger 13. Thus, the by-pass conduit(s) may connect the air inlet line 33 directly to the stack 9 air inlet. The amount of air provided into the by-pass conduit(s) can be controlled by flow regulator, such as a computer or operator controlled valve. The plurality of air inlet conduits 25 in the base are fluidly connected to a third outlet of the heat exchanger 13. The central air/ATO exhaust conduit 27 is fluidly connected to a fourth inlet of the heat exchanger 13. An air/ATO exhaust line 35 is connected to a fourth outlet of the heat exchanger 13. If desired, the heat exchanger 13 may have separate air and ATO exhaust lines (i.e., some or all of the hot air exhaust may bypass the ATO, which can instead use fresh inlet air for the oxidation reaction).

Preferably, the base 3 and the shell 11 are also used to provide an electrical connection from the stacks 9 to the power conditioning equipment. For example, the upper surface 7 of the base 3 may contain a plurality of electrical contacts 41 such as negative or ground electrical contacts. Each contact 41 is located where a bottom end plate of a fuel cell stack 9 would touch the base plate 7 (i.e., the upper surface) of the base 3. Each negative or ground electrode or end plate of each fuel cell stack 9 is electrically connected to one of the plurality of electrical contacts 41. The base 3 also contains a common electrical bus 43, such as a negative or ground bus, which is electrically connected to the fuel cells 9 through the contacts 41.

The shell 11 contains at least one other electrical bus 45, such as a separate electrical bus 45 for each stack 9. The bus 45 has a different polarity than the polarity of the common electrical bus 43. For example, the shell 11 may have a plurality of positive buses 45. A positive electrode or end plate of a fuel cell stack 9 is electrically connected to a respective positive electrical bus 45 extending from the shell 11.

The positive electrode or end plate of each fuel cell stack 9 may be electrically connected to the respective positive electrical bus 45 using any suitable contact or electrical connection. For example, as shown in FIG. 1B, an upper interior surface of the shell 11 contains a plurality of electrically conductive pressure members 47. The pressure members 47 on the shell 11 are aligned with the stack 9 positions over the contacts 41 on the upper surface 7 of the base 3. Each pressure member 47 removably holds at least one fuel cell stack 9 between the shell 11 and the upper surface 7 of the base 3. The positive electrode or end plate of each fuel cell stack 9 is electrically connected to the positive electrical bus 45 through a respective pressure member 47. The pressure member 47 may be a flexible bar, plate or spring which puts a downward pressure on the stack 9 to keep the stack 9 firmly against the electrical contact 41 on the upper surface 7 of the base. When the shell 11 is pushed down to close the module 1, the pressure member flexes to press the stack 9 into place on the base 3. When the shell 11 is removed to service or repair the module, the pressure member releases the stack 9.

Preferably, but not necessarily, each stack 9 or each pair of stacks 9 are connected to a separate DC/DC converter unit of the power conditioning system. For example, one electrical input/output of each stack in each pair of stacks may be connected in series and the other electrical input/output of each stack in each pair of stacks provides a respective positive and negative voltage inputs into the respective DC/DC converter unit. Preferably, but not necessarily, the fuel cell stacks (i.e., fuel cell stack columns) may be arranged in a multiple of six to simplify power conditioning, as described in U.S. application Ser. Nos. 11/797,707 and 11/707,708, filed on May 5, 2007 and incorporated herein by reference in their entirety. Thus, each module may have 6, 12, 18, 24, etc. stacks 9. For example, the module 1 shown in FIGS. 1C to 1E contains twelve stacks 9. Each set of four stacks may be connected to one respective phase output of a three phase AC output, as described in U.S. application Ser. No. 11/797,707.

Thus, in a system comprising a plurality of modules, each module 1 may be electrically disconnected, removed from the fuel cell system and/or serviced or repaired without stopping an operation of the other modules 1 in the fuel cell system. In other words, each module 1 may be electrically disconnected, removed from the fuel cell system and/or serviced or repaired while the other modules 1 continue to operate to generate electricity. Thus, the entire fuel cell system does not have to be shut down when one stack 9 malfunctions or is taken off line for servicing.

When one module 1 is taken off line (i.e., it is turned off to be removed, repaired or serviced), while the other modules 1 continue to operate, the flow of fuel to the module 1 which is taken off line should be stopped. This may be accomplished by placing valve in each fuel inlet line 29. The valve may be turned off manually or electronically to stop the flow of fuel through a given fuel inlet line 29, while the fuel continues to flow through the other fuel inlet lines 29 to the other modules 1.

The second embodiment of the invention provides a multi-stream heat exchanger 13 for a fuel cell system, where more than two fluid streams exchange heat in the same device. Thus, a single multi-stream heat exchanger can replace multiple separate heat exchangers, such as separate air and fuel heat exchangers, used in prior art systems. The multi-stream heat exchanger allows for the same amount of heat exchange as separate fuel and air heat exchangers, but with a smaller amount of heat transfer area. The multistream heat exchanger provides an improved mechanical configuration, which can lead to easier assembly, more efficient heat exchange surfaces, reduced pressure drops, and smaller equipment volume. Furthermore, if desired, a steam generator and/or an external reformer 37 may be physically integrated into the multi-stream heat exchanger 13 such that the heat of the fuel cell stack 9 anode exhaust stream and/or ATO 10 exhaust stream is used to convert water to steam and/or to provide heat for a hydrocarbon fuel to hydrogen and carbon monoxide fuel reformation reaction, such as a steam-methane reformation ("SMR") reaction.

The multi-stream heat exchanger 13 may serve as a base or be located in the base 3 for building the hot box of the fuel cell system. Thus, the multi-stream heat exchanger 13 lowers the center of gravity of the module 1 and makes the module more stable. The use of a single multi-stream heat exchanger 13 reduces the number of air flow controls in the system from two to one. The ATO air flow control may be eliminated. Furthermore, as described with respect to FIG. 2C below, the ATO air inlet can be completely eliminated and replaced with the cathode exhaust as the source of air for the ATO. It makes the system integration simpler by reducing the amount of additional plumbing. Furthermore, the multi-stream heat exchanger 13 increases the efficiency of the system, facilitating better heat transfer, and reducing the parasitic losses, including the gain from the elimination of the ATO air blower. Finally, the multi-stream heat exchanger 13 allows the use of a combination of low and high temperature materials in zones 15 and 17 to reduce the cost of the device.

Figure 2A:
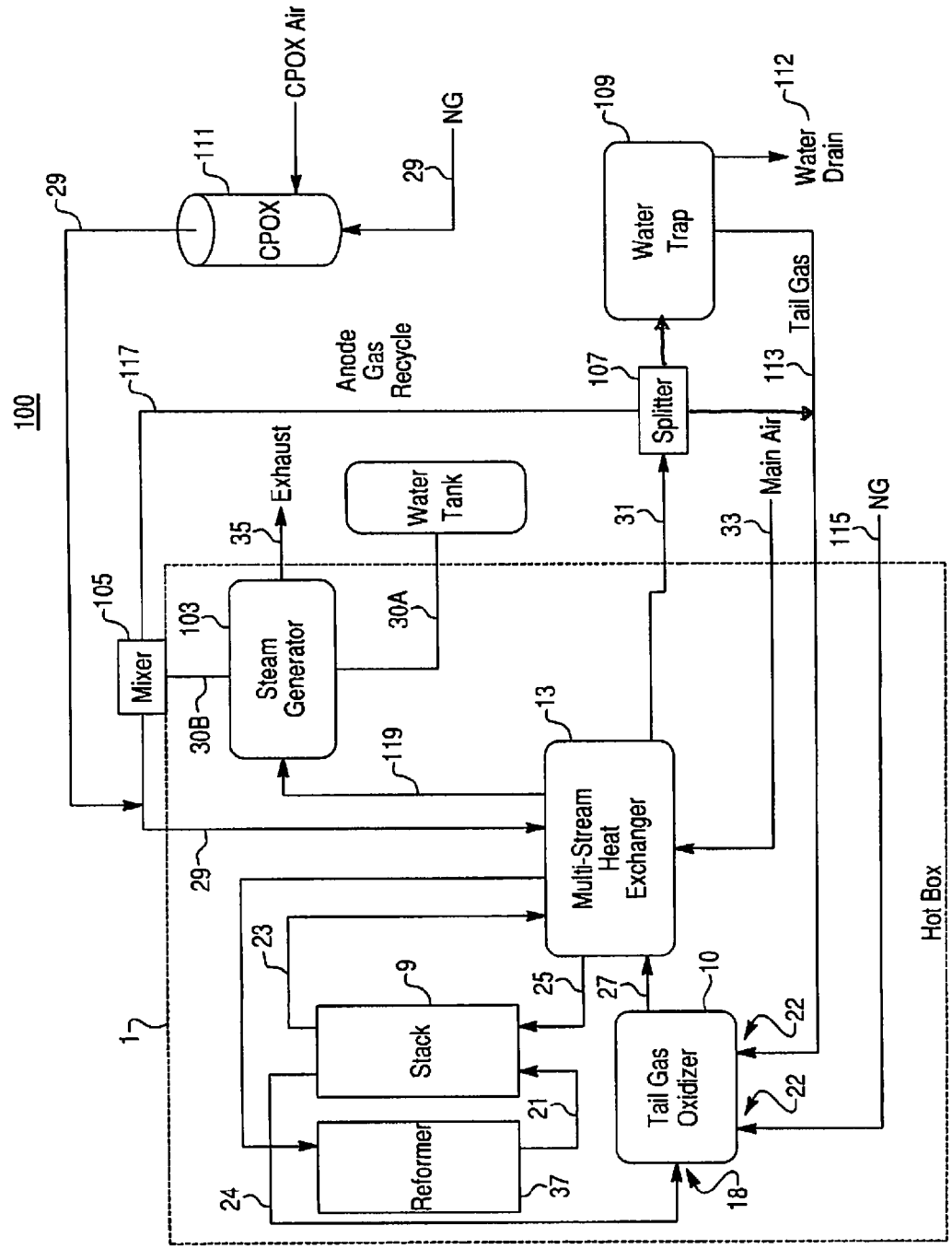
FIGS. 2A, 2B, and 2C are schematic diagrams of the components and fluid flow directions of fuel cell systems of embodiments of the invention.

FIG. 2A illustrates a process flow diagram for a fuel cell system 100 containing one or more modules 1 of the second embodiment. One module 1 is shown for clarity in FIG. 2A. The system 100 contains the plurality of the fuel cell stacks 9, such as a solid oxide fuel cell stacks (where one solid oxide fuel cell of the stack contains a ceramic electrolyte, such as yttria stabilized zirconia (YSZ) or scandia stabilized zirconia (SSZ), an anode electrode, such as a nickel-YSZ or Ni-SSZ cermet, and a cathode electrode, such as lanthanum strontium manganite (LSM)). The module 1 is represented as a hot box which may comprise the combination of the base 3 and the shell 11, as shown in FIG. 1B. The optional reformer 37 is shown separately from the heat exchanger 13. However, as noted above, the heat exchanger 37 may be physically integrated into the heat exchanger 13.

The system 100 also contains a steam generator 103. The steam generator 103 is provided with water through conduit 30A from a water source 104, such as a water tank or a water pipe, and converts the water to steam. The steam is provided from generator 103 to mixer 105 through conduit 30B and is mixed with the stack anode (fuel) recycle stream in the mixer 105. The mixer 105 may be located inside or outside the hot box of the module 1. Preferably, the humidified anode exhaust stream is combined with the fuel inlet stream in the fuel inlet line or conduit 29 downstream of the mixer 105, as schematically shown in FIG. 2A. Alternatively, if desired, the fuel inlet stream may also be provided directly into the mixer 105, or the steam may be provided directly into the fuel inlet stream and/or the anode exhaust stream may be provided directly into the fuel inlet stream followed by humidification of the combined fuel streams, as shown in FIGS. 1C, 1D and 1E.

The steam generator 103 may be heated by a separate heater and/or by the hot ATO exhaust stream which is passed in heat exchange relationship with the steam generator 103. If the steam generator 103 is physically incorporated into the heat exchanger 13, then the steam generator may also be heated by the anode exhaust stream in the heat exchanger. The steam generator 103 may be physically located in the hot box, such as inside the chamber 5 of the base 3. Alternatively, the steam generator 103 may be located outside the hot box of the module 1. Thus, as shown in FIG. 1C, if the steam generator 103 is located in the hot box of the module, then water is provided from the water source 104 through conduit 30. If the steam generator 103 is located outside of the hot box of the module, then steam is provided from the water source 104 through conduit 30.

The system 100 also contains a splitter 107, an optional water trap 109 and a catalytic partial pressure oxidation (CPOx) reactor 111. The water trap 109 and drain are not required if the anode exhaust stream provided to the ATO 10 can be kept sufficiently hot to avoid condensation. The system operates as follows. The inlet fuel stream, such as a hydrocarbon stream, for example natural gas, is provided into the fuel inlet conduit 29 and through the CPOx reactor 111. During system start up, air is also provided into the CPOx reactor 111 to catalytically partially oxidize the fuel inlet stream. During steady state system operation, the air flow is turned off and the CPOx reactor acts as a fuel passage way in which the fuel is not partially oxidized. Thus, the system 100 may comprise only one fuel inlet conduit which provides fuel in both start-up and steady state modes through the CPOx reactor 111. Therefore a separate fuel inlet conduit which bypasses the CPOx reactor during steady state operation is not required.

The fuel inlet stream is provided into the multi-stream heat exchanger 13 where its temperature is raised by heat exchange with the stack anode (fuel) exhaust streams and optionally the ATO exhaust stream. The fuel inlet stream is then optionally provided into the optional reformer 37 which may be integrated into the heat exchanger 13 or be located in the hot box separately from the heat exchanger 13. The fuel inlet stream is reformed in the reformer via the SMR reaction and the reformed fuel inlet stream (which includes hydrogen, carbon monoxide, water vapor and unreformed methane) is provided into the stacks 9 through the fuel inlets 21. The fuel inlet stream travels upwards through the stacks through fuel inlet risers in the stacks 9 and is oxidized in the stacks 9 during electricity generation. The oxidized fuel (i.e., the anode or fuel exhaust stream) travels down the stacks 9 through the fuel exhaust risers and is then exhausted from the stacks through the fuel exhaust opening 23 into the heat exchanger 13.

In the heat exchanger 13, the anode exhaust stream heats the fuel inlet stream and the air inlet stream via heat exchange. Alternatively, a portion of the anode exhaust stream may be removed from the multistream heat exchanger without exchanging heat to the incoming air. This portion can be used as fuel for the ATO. The anode exhaust stream is then provided via the fuel exhaust conduit 31 into a splitter 107. A first portion of the anode exhaust stream is provided from the splitter 107 into the water trap 109. In the water trap 109, the water is removed from the anode exhaust stream and the removed water is stored or drained via drain 112. The remaining anode exhaust stream may be provided from the water trap 109 into the ATO 10 via conduit 113. The anode exhaust stream may be provided with fresh fuel, such as natural gas from conduit 115 into the ATO 10 through fuel inlets 22 as a combined ATO fuel inlet stream.

A second portion of the anode exhaust stream is recycled from the splitter 107 into the fuel inlet stream. For example, the second portion of the anode exhaust stream is recycled through conduit 117 by a blower (not shown in FIG. 2A) into the mixer 105. The anode exhaust stream is humidified in the mixer 105 by mixing with the steam provided from the steam generator 103. The humidified anode exhaust stream is then provided from the mixer 105 into the fuel inlet conduit 29 where it mixes with the fuel inlet stream. Providing water from the water tank 104 to make steam is optional. All of the humidification for the fresh fuel can be provided by anode recycle stream.

The air inlet stream is provided by a blower (not shown) from the air inlet conduit 33 into the heat exchanger 13. The blower may comprise the single air flow controller for the entire system. In the heat exchanger, the air inlet stream is heated by the ATO exhaust stream and the anode exhaust stream via heat exchange. The heated air inlet stream is then provided into the module through the air inlets 25. The air passes through the stacks 9 into the ATO 10. In the ATO 10, the air exhaust stream oxidizes the ATO fuel inlet stream to generate an ATO exhaust stream. The ATO exhaust stream is exhausted through the ATO exhaust conduit 27 into the heat exchanger 13. The ATO exhaust stream heats the air inlet streams in the heat exchanger 13 via heat exchange (and optionally heats the fuel). The ATO exhaust stream (which is still above room temperature) is provided from the heat exchanger 13 to the steam generator 103 via conduit 119. The heat from the ATO exhaust stream is used to convert the water into steam via heat exchange in the steam generator 103. The ATO exhaust stream is then removed from the system via conduit 35. If the steam generator 103 is physically integrated into the heat exchanger 13, then conduit 119 can be omitted and the steam generation takes place in the heat exchanger 13. Thus, by controlling the air inlet blower output (i.e., power or speed), the magnitude (i.e., volume, pressure, speed, etc.) of air introduced into the system may be controlled. The cathode (air) exhaust stream is used as the ATO air inlet stream, thus eliminating the need for a separate ATO air inlet controller or blower. Furthermore, since the ATO exhaust stream is used to heat the air and fuel inlet streams, the control of the single air inlet stream in conduit 33 can be used to control the temperature of the stacks 9 and the ATO 10. If the air by-pass conduit is present, then this conduit enhances the ability to control the stack 9 and ATO 10 temperature by controlling the amount of air provided into the heat exchanger 13 compared to the amount of air provided directly into the stacks 9 through the by-pass conduit.

Figure 3:
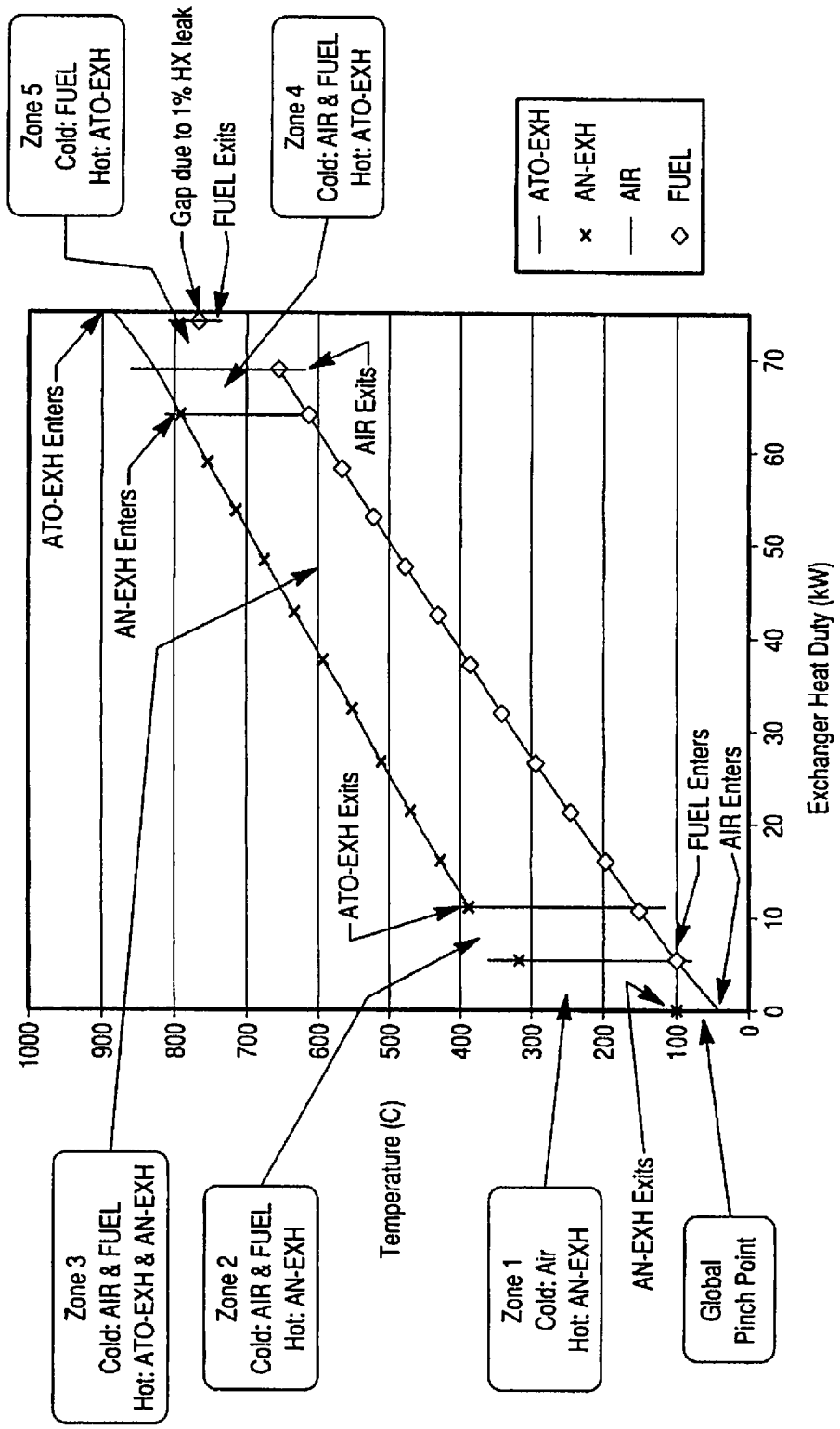
FIG. 3 is a plot of idealized heat exchanger heat duty versus temperature (grand composite curve) for a heat exchanger according to an embodiment of the present invention, based on a computer simulation.
Figure 4:
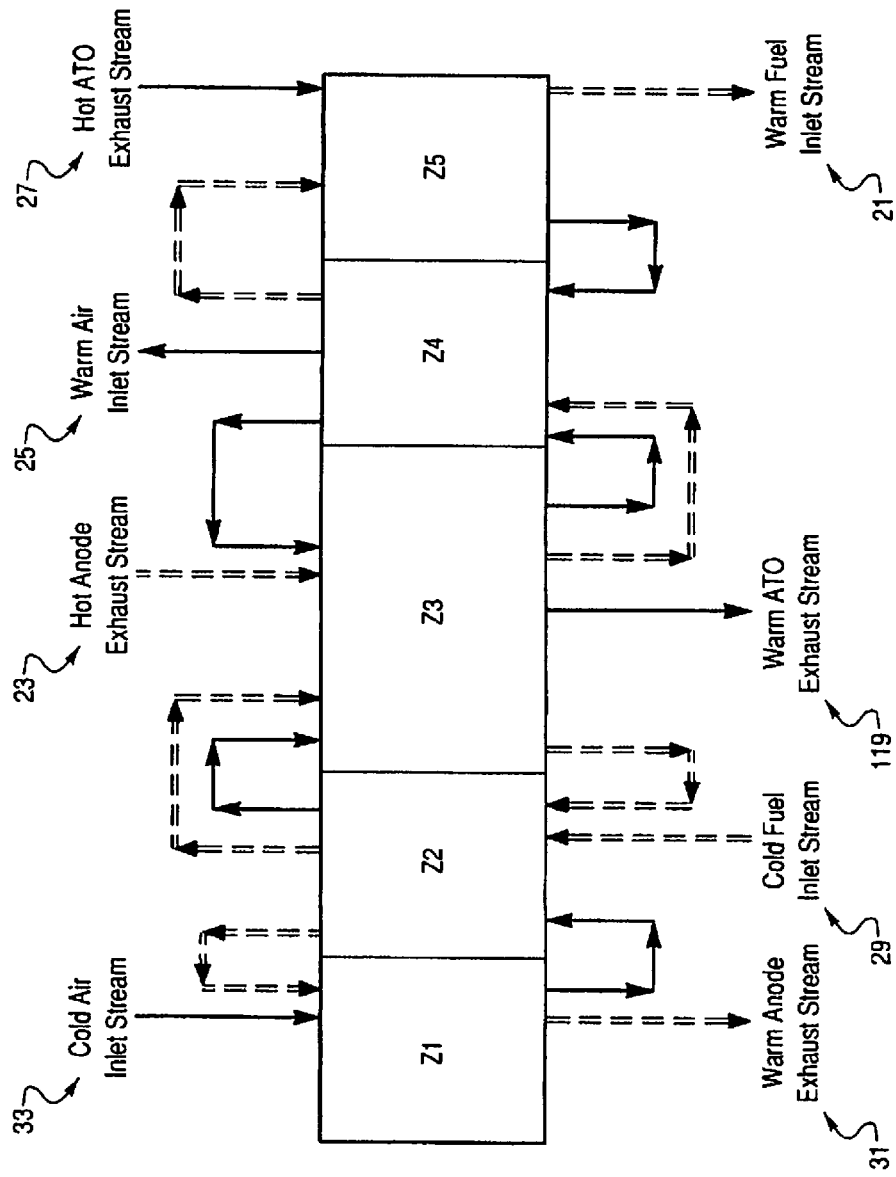
FIG. 4 is a schematic diagram of the zones and fluid flow directions of the heat exchanger according to an embodiment of the present invention.

FIGS. 3 and 4 illustrate the fluid flows though an exemplary five zone heat exchanger 13. The zones are labeled Z1 to Z5 in FIG. 4. It should be noted that the heat exchanger 13 may have less than five zones, such as one to four zones or more than five zones, such as six to ten zones. The heat exchanger may be a counterflow, a co-flow or a combination thereof heat exchanger type having a plate and fin or other suitable configuration. Counterflow is preferable to reduce the total amount of required heat transfer area. Furthermore, the order of fluid flow introduction and the flow stream temperatures described below are exemplary and may be changed depending on the specific system configuration.

The cold air inlet stream enters zone 1 of the heat exchanger at about ambient (plus the blower heat of compression) temperature from conduit 33 and is heated by the hot anode exhaust stream. The anode exhaust stream gives up some of its heat and exits as warm anode exhaust stream (at a temperature of about 100 C, for example) into conduit 31.

The warmed air inlet stream (at a temperature of about 100 C) is provided from zone 1 into zone 2 of the heat exchanger. The relatively cold fuel inlet stream (which has been warmed to about 100 C by the addition of the steam from the steam generator and of the recycled anode exhaust stream from conduit 117) is also provided from conduit 29 into zone 2 of the heat exchanger. The air and fuel inlet streams are not mixed but flow through different respective channels in zone 2 separated by the heat exchanger plates, or in separate channels of a single heat exchanger plate. The air and fuel inlet streams are heated by the hot anode exhaust stream in zone 2 via heat exchange across the heat exchanger plates.

The warmed air and fuel inlet streams (at a temperature of about 150 C) are provided into zone 3 of the heat exchanger 13. The hot anode exhaust stream also first enters the heat exchanger 13 in zone 3 at a temperature of about 800 C. The air and fuel inlet streams are heated by the hot anode exhaust stream and by the hot ATO exhaust stream in zone 3 via heat exchange across the heat exchanger plates. The anode and ATO exhaust streams are not mixed but flow through different respective channels in zone 3 separated by the heat exchanger plates. After exchanging heat, the warm ATO exhaust stream exits the heat exchanger 13 in zone 3 into conduit 119 at a temperature of about 300 C. The ATO exhaust stream is then used to generate steam in the steam generator 103. As can be seen from FIGS. 3 and 4, zone 3 may be the largest or longest zone of the heat exchanger 3 (i.e., the zone with the longest fluid flow channel length) where the fluid streams spend the longest time of any zone in the heat exchanger.

The further warmed air and fuel inlet streams (at a temperature of about 600 C) are provided into zone 4 of the heat exchanger 13. The air and fuel inlet streams are heated by the hot ATO exhaust stream in zone 4 via heat exchange across the heat exchanger plates. The warmed up air inlet stream exits the heat exchanger 13 in zone 4 into conduits 25 at a temperature of about 650 C to be provided into the fuel cell stacks 9.

The further warmed fuel inlet stream (at a temperature of about 650 C) is provided into zone 5 of the heat exchanger 13. The ATO exhaust stream first enters the heat exchanger 13 in zone 5 from conduit 27 at a temperature of about 875 C. The fuel inlet stream is heated by the hot ATO exhaust stream in zone 5 via heat exchange across the heat exchanger plates. The warmed up fuel inlet stream exits the heat exchanger 13 in zone 5 into conduits 21 at a temperature of about 750 C to be provided into the fuel cell stacks 9 (and/or into the reformer 37 if a separate reformer is present).

As shown in FIG. 3, a gap due to an about 1% heat exchanger heat leak is assumed. Furthermore, as shown in FIG. 3, the hot streams (ATO and anode exhaust streams) are maintained at about the same temperature as each other in each zone where they are both present. Likewise, the cold streams (air and fuel inlet streams) are maintained at about the same temperature as each other in each zone where they are both present. Finally, the global pinch point is shown in FIG. 3.

With respect to FIG. 1B, the low temperature portion 15 of the heat exchanger 13 may preferably correspond to zones 1 and 2 (and optionally an adjacent portion of zone 3) shown in FIG. 4, while the high temperature portion 17 of the heat exchanger 13 may correspond to zones 4 and 5 (and optionally an adjacent portion of zone 3) shown in FIG. 4. However, the subdivision of the heat exchanger into portions employing different materials of construction is not restricted to any subset of zones.

Figure 2B:
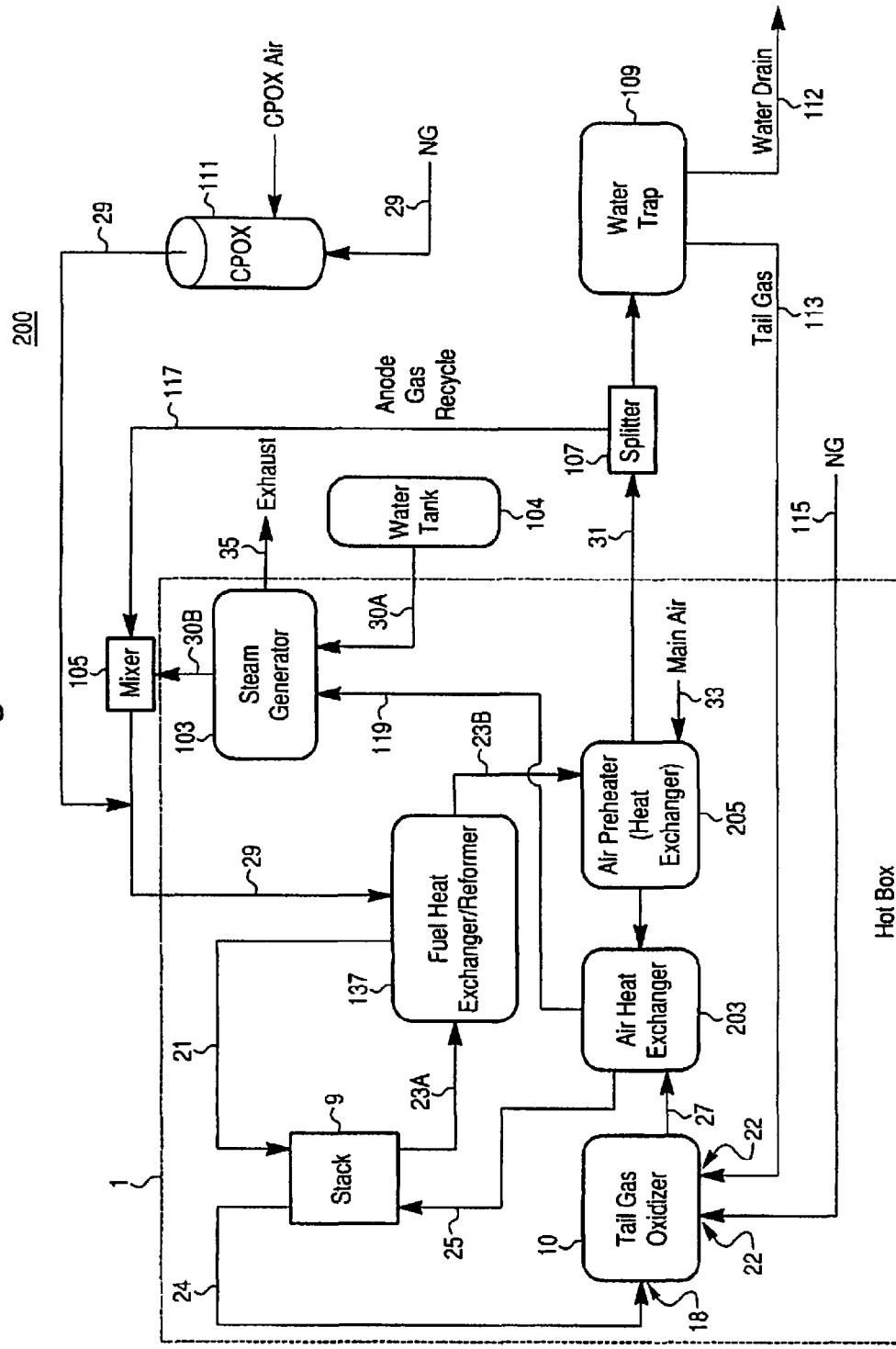

FIG. 2B illustrates a schematic of a system 200 according to another embodiment of the invention in which the single multi-stream heat exchanger 13 is replaced with separate heat exchangers. The commonly numbered elements which are common to both system 100 of FIG. 2A and system 200 of FIG. 2B will not be described again for the sake of brevity. As shown in FIG. 2B, the multi-stream heat exchanger 13 is replaced with a fuel heat exchanger 137, an air heat exchanger 203 and an optional air preheater heat exchanger 205.

As shown in FIG. 2B, the external reformer 37 may be omitted if the fuel cells or the fuel cell stack 9 contain internal fuel reformation catalyst. Alternatively, the fuel heat exchanger 137 may contain the reformation catalyst in the fuel inlet portion of the heat exchanger. In this case, the heat exchanger 137 functions as both a heat exchanger and a reformer.

Figure 2C:
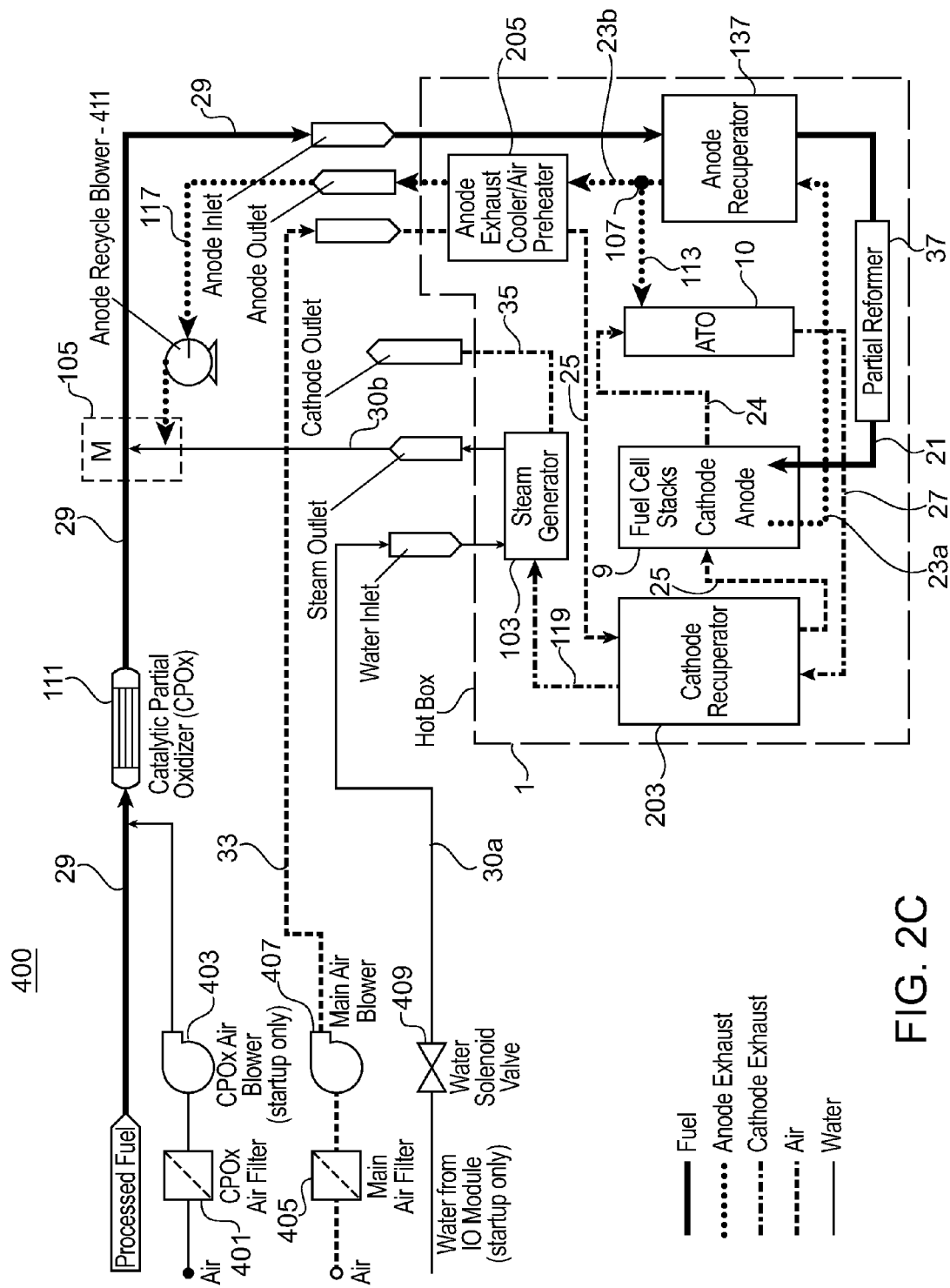

FIG. 2C illustrates a schematic of a system 400 according to another embodiment of the invention. The commonly numbered elements which are common to both system 100 of FIG. 2A, system 200 of FIG. 2B and system 400 of FIG. 2C will not be described again for the sake of brevity. As shown in FIG. 2C, the water trap 109 may be omitted and the entire portion of fuel exhaust stream provided from splitter 107 into conduit 113 may be recycled into the ATO 10. Optionally, the splitter 107 is located upstream of the air preheater 205, so that the anode exhaust stream which will be used as fuel for the ATO 10 does not go through the air preheater 205. Thus, only the portion of the anode exhaust stream in conduit 23B which will be recycled into the fuel inlet stream in conduit 29 is provided into the air preheater 205 to heat the air inlet stream. This configuration reduces cost due to a smaller heat exchange area the air preheater, increases efficiency due to a reduced anode recycle blower 411 power due to a decreased pressure drop, and reduces mechanical complexity in the hot box due to fewer gas passes.

Additional elements shown in FIG. 2C include the CPOx air filter 401 and blower 403, which supply air to the CPOx 111 during system start-up, a main air filter 405 and blower 407 which supply air into the air inlet conduit 33 during system 400 operation and a solenoid valve 409 which controls water being provided through conduit 30A. Furthermore, while a reformer 37 is shown in FIG. 2C, it should be noted that it may be omitted if the internal reformation is used and/or reformer 37 may be a partial reformer or pre-reformer if a combination of internal and external reformation is used.

Furthermore, the natural gas inlet conduit 115 into the ATO 10 is omitted in the embodiment of FIG. 2C. Instead all of the fuel for the ATO 10 may be provided from the fuel cell stack 9 anode tail gas recycle conduit 113. Likewise, there is no separate air inlet into the ATO. Instead, the air is provided to the ATO solely from the cathode exhaust stream via conduit 24. For a thermally well packaged system with internal fuel reformation, external fuel reformation or a combination of the two, the introduction of a separate fresh fuel into the ATO 10 through conduit 115 is omitted. Instead, the amount of fresh fuel provided to the stack 9 via conduit 29 is controlled or adjusted to control the heating up process. It should be noted that the conduit 115 may also be omitted in the embodiments of FIGS. 2A and 2B.

The elimination of the separate fuel conduit to the ATO (and associated fuel blower) and the use of the stack cathode exhaust stream as the source of oxidizer gas in the ATO 10 (instead of using a separate air inlet conduit to provide fresh air into the ATO 10) reduces the complexity and cost of the fuel cell and control systems and method of operating the system (e.g., a separate ATO air blower is not required). For example, control of the main air inlet stream in conduit 33 via the air blower 407 may be used as the main control for the system temperature, ATO temperature, or a mathematical function involving both stack temperature and ATO temperature.

Thus, the control or variation of the main air flow in conduit 33 via a variable speed blower 407 and/or by control valve (not shown for clarity) can be used to control and maintain the stack 9 temperature, the ATO 10 temperature, or both. Furthermore, the control or variation of fuel utilization (i.e., a ratio of current drawn from the stack to fuel flow) may be used to control and maintain the ATO 10 temperature. Finally, control or variation of the anode recycle flow in conduit 117 via a variable speed blower 411 and/or a control valve (not shown for clarity) can be used to control the amount of anode exhaust split between the ATO 10 and recycled to the fuel inlet stream in conduit 29.

Other advantages of eliminating a separate air inlet stream into the ATO 10 include less ATO catalyst and less catalyst support fins required due to higher average temperature of the cathode exhaust, a reduced cathode side pressure drop due to lower cathode exhaust flows, an increased efficiency due to elimination of a power required to drive the ATO blower and a reduced main air power due to lower cathode side pressure drop, reduced emissions because the ATO operates with much more excess air, and potentially more stable ATO operation, since the ATO is always hot enough for fuel oxidation after start-up. Likewise, the elimination of the separate fuel inlet 115 reduces the system costs because a separate ATO fuel inlet is not required, increases efficiency because there is no extra fuel consumption during steady state or ramp to steady state, and reduced emissions because methane, which is hardest to oxidize, is not added and does not slip through.

The system 200 shown in FIG. 2B operates similarly to the system 100 shown in FIG. 2A. However, in the system 200, the air inlet stream in conduit 33 is first provided into the optional air preheater heat exchanger 205 where the air inlet stream is preheated by the fuel (anode) exhaust stream. The terms fuel exhaust and anode exhaust are used interchangeably herein with respect to solid oxide fuel cell stacks. The preheated air inlet stream is then provided into the air heat exchanger 203 where it is heated by the ATO 10 exhaust stream from conduit 27. The ATO exhaust stream is then provided from the air heat exchanger 203 via conduit 119 to the steam generator 103. The hydrocarbon fuel inlet stream is provided via the fuel inlet conduit 29 into the fuel heat exchanger 137. The fuel inlet stream is then provided into the fuel cell stack(s) 9 via conduit 21 where the fuel inlet stream may be reformed internally. Alternatively, a separate external reformer 37 or an external reformer integrated into heat exchanger 137 may be used instead. The fuel exhaust stream is provided form the stack(s) 9 into the fuel heat exchanger 137 via conduit 23A. The fuel exhaust stream is then provided from the fuel heat exchanger 137 via conduit 23B into the optional air preheater heat exchanger 205. The fuel exhaust stream is then provided from the air preheater heat exchanger 205 via conduit 31 into the splitter 107.

The system 400 shown in FIG. 2C operates similarly to the system 200 shown in FIG. 2B, with the following differences. Separate fuel is not provided into the ATO 10 via conduit 115. Instead, the ATO uses the anode exhaust stream as its entire fuel source. The splitter 107 is moved upstream of the air preheater 205, such that only the part of the anode exhaust that is being recycled into the fuel inlet stream is provided into the preheater 205. However, the part of the anode exhaust stream that is provided into the ATO does not pass through the preheater 205.

If desired, the reformer 37 and/or the steam generator 103 may optionally be integrated into the existing zones of the heat exchanger or they may be added as additional zones of the multi-stream heat exchanger 13 shown in FIG. 2A or into one of the separate heat exchangers shown in FIGS. 2B and 2C. For example, the reformer catalyst may be provided into the fuel inlet stream conduits in zones 3, 4 and/or 5 to integrate the reformer 37 into the heat exchanger 13.

Figure 5:
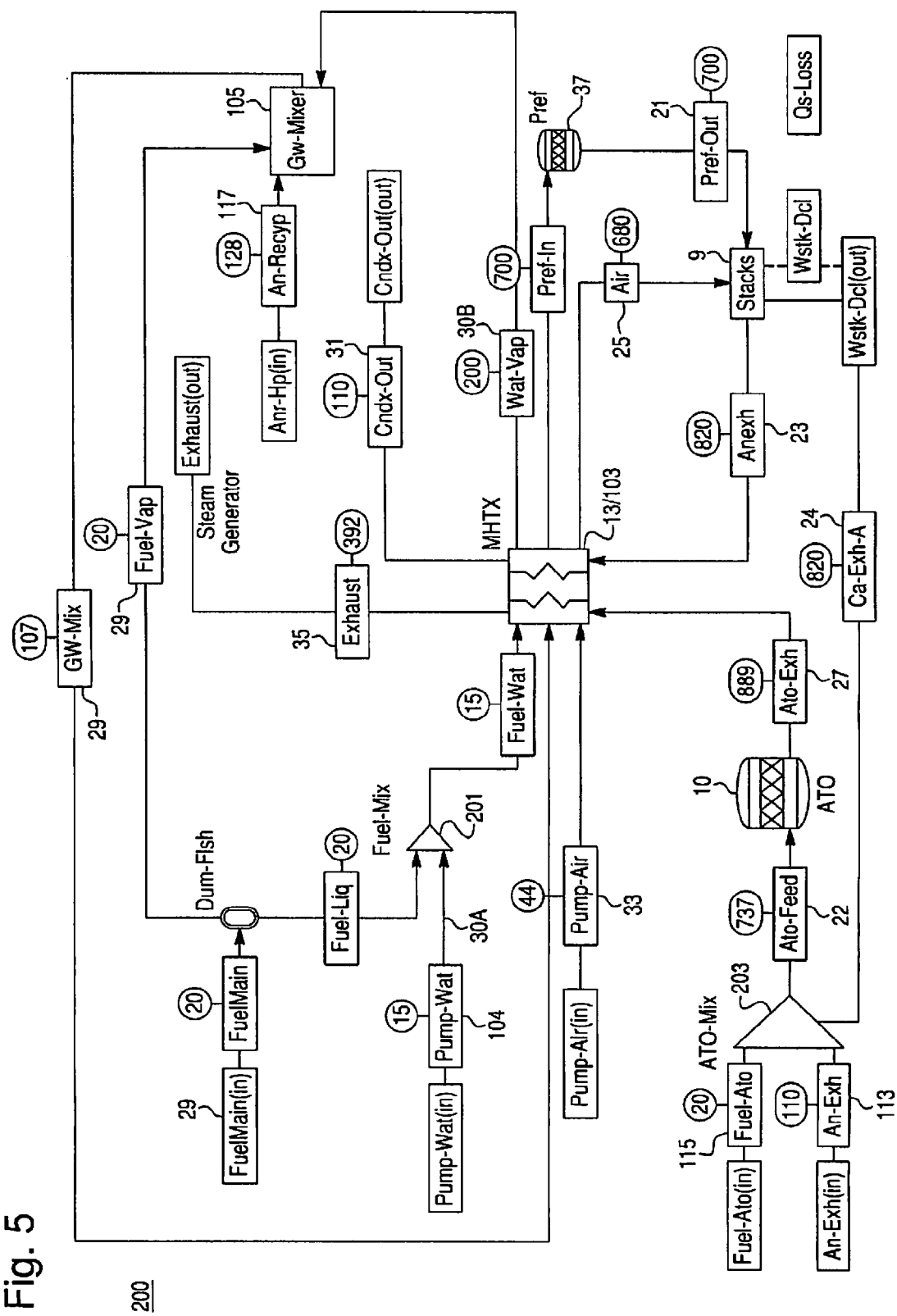
FIG. 5 is a process flow diagram for a system containing a steam generator which is integrated into a multi-stream heat exchanger.

The steam generator 103 may be physically integrated with the heat exchanger by adding the steam generator as one or more extra zones to the heat exchanger 13. FIG. 5 illustrates a process flow diagram for a system 200 containing a steam generator which is integrated into multi-stream heat exchanger 13/103. In the example of FIG. 5, the heat exchanger contains seven zones. However, a heat exchanger containing more than or less than seven zones may be used. Other elements shown in FIG. 5 having the same numbers as elements in FIG. 2A have been described above with respect to FIG. 2A and will not be described again with respect to FIG. 5 for brevity. The exemplary temperatures in each element are shown in a circle above the element. It should be noted that other suitable temperatures may be used.

The following table describes the hot and cold fluid flow streams passing through each of the seven zones Z1 to Z7 of the integrated heat exchanger/steam generator 13/103 shown in FIG. 5. The zones are not shown separately in FIG. 5 for clarity.

| Zone | Cold Side Stream | Hot Side Stream |
| --- | --- | --- |
| Z1 | Water | ANEXH |
| Z2 | Water, Air | ANEXH |
| Z3 | Water, Air | ANEXH, ATO-EXH |
| Z4 | Water, Air, Fuel-mix | ANEXH, ATO-EXH |
| Z5 | Air, Fuel-mix | ANEXH, ATO-EXH |
| Z6 | Fuel-mix | ANEXH, ATO-EXH |
| Z7 | Fuel-mix | ATO-EXH |

In the table above, "water" corresponds to the water inlet stream from the water source 104 and conduit 30A, "air" corresponds to the air inlet stream from conduit 33, "fuel-mix" corresponds to the humidified fuel inlet stream from conduit 29, "ANEXH" corresponds to the anode exhaust stream from conduit 23 and ATO-EXH corresponds to the ATO exhaust stream from conduit 27. Thus, "water" is present in zones Z1 to Z4 (enters in Z1 and exits in Z4), "air" is present in zones Z2 to Z5 (enters in Z2 and exits in Z5) and "fuel-mix" is present in zones Z4 to Z7 (enters in Z4 and exits in Z7). These cold side streams are heated by the "ANEXH" stream in zones Z1 to Z6 (enters in Z6 and exits in Z1) and by the ATO-EXH stream in zones Z3 to Z7 (enters in Z7 and exits in Z3).

Thus, zone Z1 corresponds to a portion of the steam generator 103, zones Z2 to Z4 correspond to a hybrid steam generator/heat exchanger, and zones Z5 to Z7 corresponds to the heat exchanger. Of course other heat exchanger and flow configurations may also be used. It should be noted that in FIG. 5, if a liquid hydrocarbon fuel is used, then the liquid fuel may be provided into the steam generator together with the water to vaporize the liquid fuel. An optional liquid fuel/water mixer 201 may be used to mix the liquid fuel and water. Alternatively, the liquid hydrocarbon fuel could be vaporized in a vaporizer distinct from the steam generator, yet integrated with the rest of the heat exchanger. Furthermore, an optional ATO fuel/anode exhaust mixer 203 may be used to mix the ATO fuel, such as natural gas in conduit 115, with the anode exhaust in conduit 113, prior to providing the mixed fuel into the ATO inlet 22.

Figure 6:
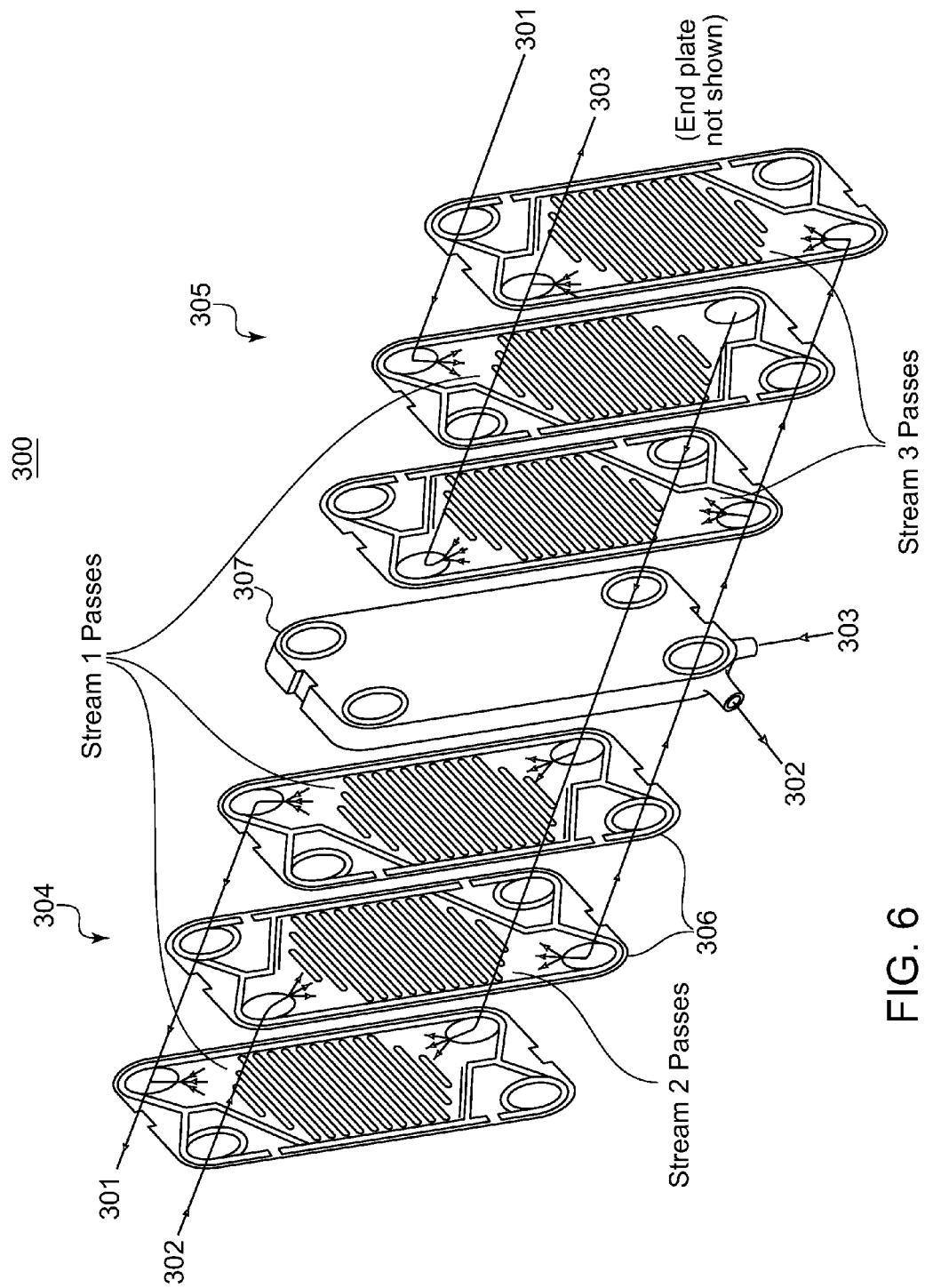

FIGS. 6 and 7 are non-limiting, three dimensional cutaway views of two types of multi-stream plate heat exchangers. In should be noted that other heat exchanger configurations may be used. FIG. 6 shows a heat exchanger 300 configuration where two streams exchange heat in each zone (such as zones Z1 and Z5 shown in FIG. 4). For example, streams 301 and 302 exchange heat in zone 304 (left end) and stream 301 and 303 exchange heat in zone 305 (right end). Each zone 304, 305 contains ribbed or finned heat exchange plates 306. An inlet/outlet manifold 307 is located between the zones.

FIG. 7 shows another heat exchanger 310 configuration where two cold streams R1 and R2 (such as the air and fuel inlet streams) exchange heat with a single hot water containing stream, such as the anode or ATO exhaust stream (which corresponds to zones Z2 and Z4 shown in FIG. 4). In this diagram, the hot stream flows through the center holes on the plates, and R1 and R2 flow through the corner holes. These configurations can be easily extended to four (or more) fluid streams (such as zone 3 shown in FIG. 4). The heat exchanger 310 may be similar to the plate type heat exchanger 300 and contain heat exchanger plates 316. However, for example, each plate 316 may contain six openings 317 to accommodate three inlets and three outlets of the three streams and the three streams are provided in every third space between the parallel plates 316. The heat exchanger may be configured to handle more than three streams and may have different configurations other than parallel plate type configurations.

Figure 8A:
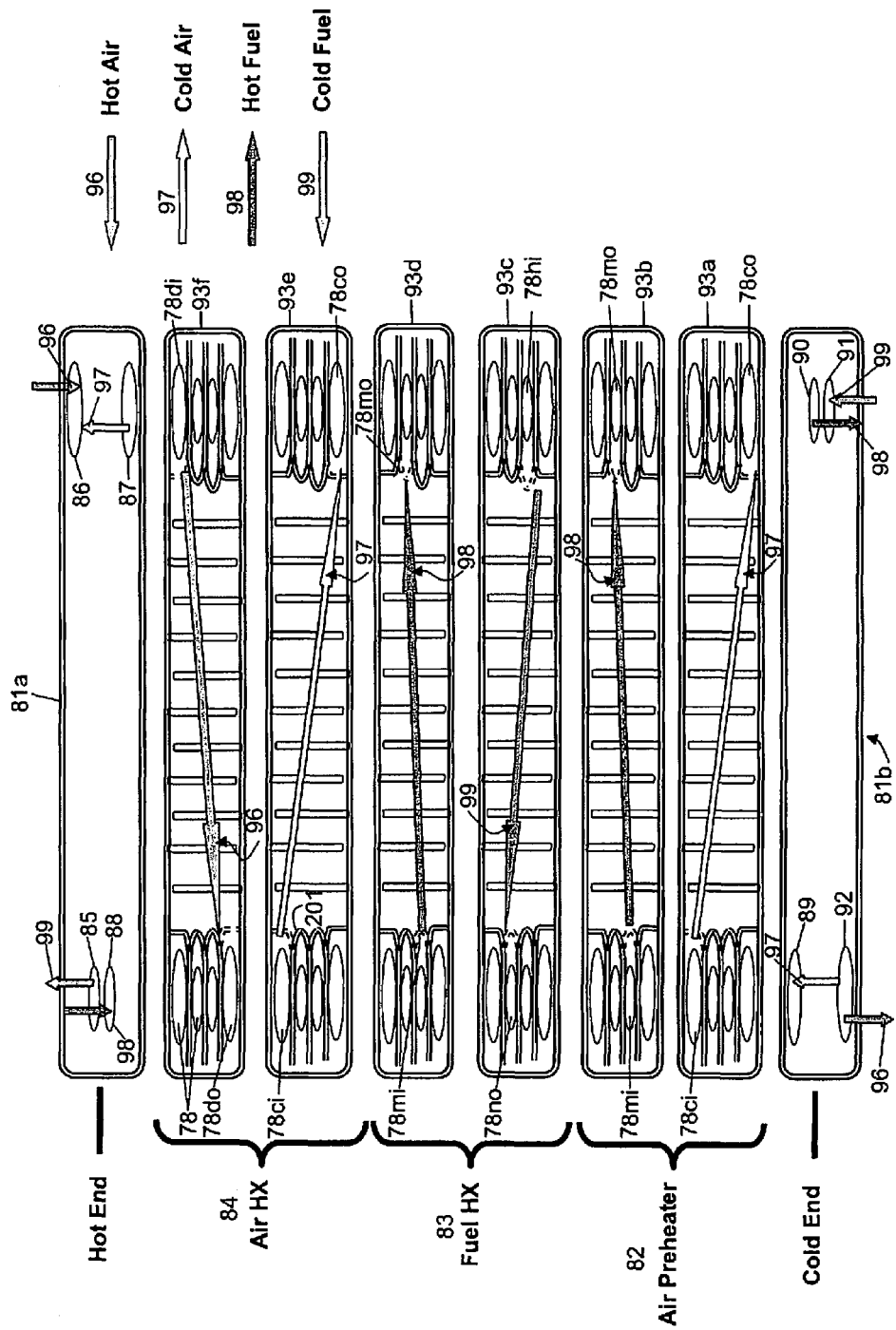
FIG. 8A is a schematic view of a multi-stream plate heat exchanger of another embodiment of the invention.

FIG. 8A shows a multi-stream heat exchanger 80 according to another embodiment of the invention. The heat exchanger 80 is comprised of a stack of intermediate plates 93 located between two end plates 81a and 81b. FIG. 8A shows the top side of each plate 81a, 93 and a bottom side of plate 81b.

The air preheater section 82 is adjacent to one end plate 81b, the air heat exchanger section 84 is located adjacent to the other end plate 81a, and the fuel heat exchanger section 83 is located in the middle. However, the position of each section can be rearranged or interspersed with any other section. Any section can be located adjacent to an end plate 81a or 81b. The air preheater 82, the air heat exchanger 84, and the fuel heat exchanger 83 can also be placed in any order within the stack. In addition, there can be multiple air and fuel heat exchanger sections, which can be mixed within the stack for optimal performance. The presence of an air preheater 82 in the heat exchanger 80 is optional.

Streams enter the heat exchanger through inlets (86, 88, 89, 91) and outlets (85, 87, 90, 92) exit though located in the end plates 81a, 81b. Preferably, hot streams (e.g., exhaust streams from the fuel cell stack) enter the heat exchanger 80 through one end plate 81a and cold streams (i.e., the inlet streams provided toward the fuel cell stack) enter through the other end plate 81b. Likewise, the hot streams exit through end plate 81b after giving up heat to the cold inlet streams, and the cold streams exit through end plate 81a after receiving heat from the hot exhaust streams. However, other configurations are also possible.

In one aspect of this embodiment, the stack of plates 81a, 93 and 81b are stacked vertically (i.e., a vertical stack of horizontal plates), with end plate 81a on top and end plate 81b on the bottom. However, the location of the end plates 81a and 81b may be reversed. Alternatively, the plates may be stacked horizontally (i.e., a horizontal stack of vertical plates) or in any direction between vertical and horizontal. Preferably, there are four streams (two hot exhaust streams and two cold inlet streams), which enter through the four inlets and exit through the four outlets. If desired, one or more optional separation plates may be inserted between the different heat exchanger sections. For example, a separation plate may be inserted between the preheater section 82 and the fuel heat exchanger section 83 and/or between the fuel heat exchanger section 83 and the air heat exchanger section 84. Thus, the air inlet stream may be heated either sequentially with anode exhaust stream and the cathode exhaust stream, or in parallel with both anode exhaust stream and the cathode exhaust stream.

Figure 8B:
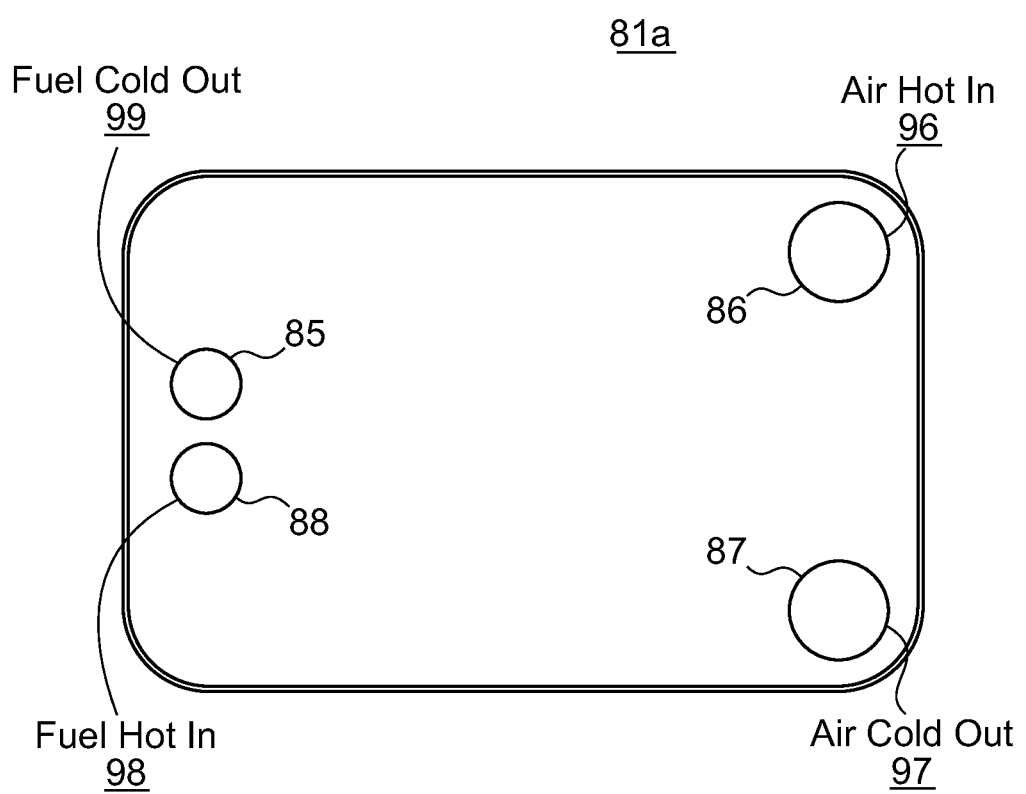
FIGS. 8B, 8C, 8D and 8E are top views of plates of the heat exchanger of FIG. 8A.

FIG. 8B shows end plate 81a, such as the top end plate. In this embodiment, the hot fuel 98 line (i.e., the conduit which carries the hot fuel or anode exhaust from the fuel cell stack) is connected to an inlet 88 and the hot air 96 line (which carries the hot air or cathode exhaust from the fuel cell stack) is connected to an inlet 86 in plate 81a. The "cold" fuel 99 line (which carries the fuel inlet stream to the fuel cell stack) exits through an outlet 85 and the cold air 97 line (which carries the air inlet stream to the fuel cell stack) exits through an outlet 87 in end plate 81a. It should be noted that while air and fuel 97 and 99 lines are labeled "cold" for convenience, it should be noted that they carry air and fuel inlet streams, respectively, which have been warmed up by the hot exhaust streams in the heat exchanger.

Preferably, the plates of the heat exchanger, such as plate 81a are rectangular in shape. Preferably, the hot fuel in and cold fuel out streams are provided on one "short" side of the plate 81a while the hot air in and cold air out streams are provided on the opposite side of the plate 81a. In the configuration shown in FIG. 8B, the air openings 86 and 87 are located in the corners while the fuel openings 85, 88 are located in the middle of their respective sides. Preferably, plate 81a contains the "hot" side of the heat exchanger, where the two hot exhaust streams (i.e., fuel and air exhaust streams from the stack) enter the heat exchanger 80 and where two heated inlet streams (i.e., fuel and air inlet streams that are heated and provided to the stack) exit heat exchanger. In order to accommodate the lower gas density of fluids at the hot end of the exchanger, the spacing between the plates may be larger at the hot end than at the cold end. Doing so would tend to keep the hot gas velocity (and thus pressure drop) lower.

Figure 8C:
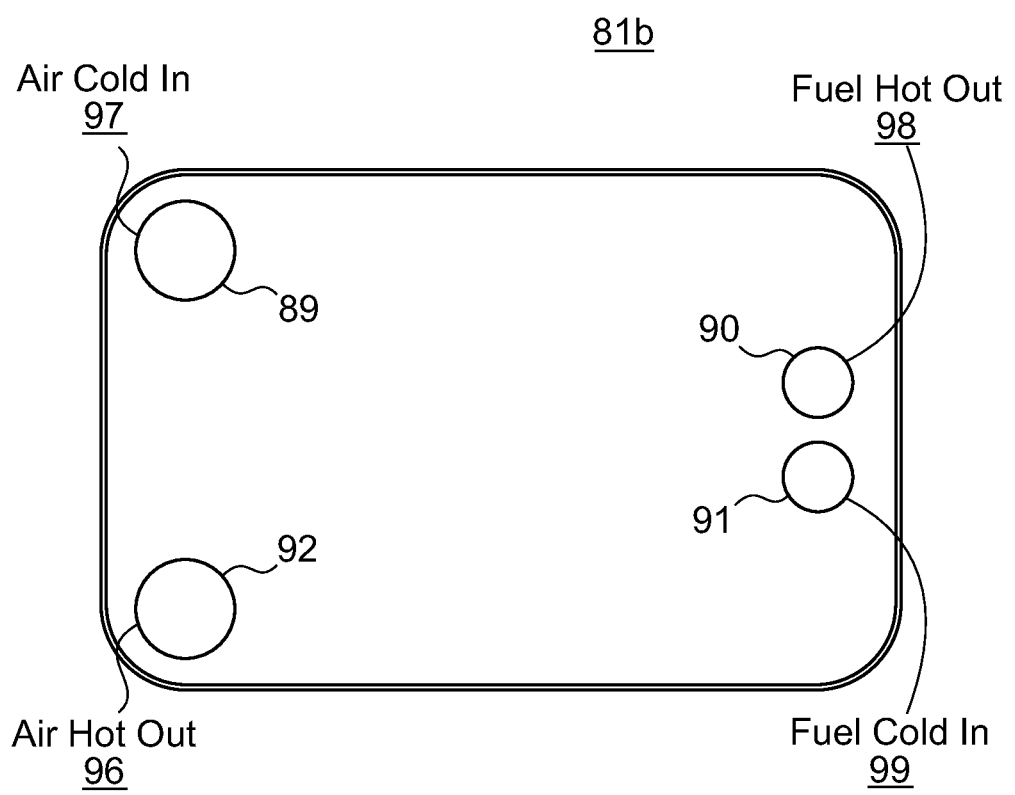

FIG. 8C shows the other end plate 81b, such as the bottom plate. The hot fuel 98 line (i.e., the conduit which carries the fuel exhaust which gave up some of the heat) exits through an outlet 90 and the hot air 96 line (which carries the air exhaust which gave up some of its heat) exits through an outlet 92. The cold fuel 99 line (which carries the cold fuel inlet stream)

enters through inlet 91. The cold air 97 line (which carries the cold air inlet stream) enters through inlet 89 in plate 81*b*.

Preferably, the hot fuel out and cold fuel in streams are provided on one "short" side of the plate 81*b* while the hot air out and cold air in streams are provided on the opposite side of the plate 81*b*. In the configuration shown in FIG. 8C, the air openings 89 and 92 are located in the corners while the fuel openings 90 and 91 are located in the middle of their respective sides. Preferably, plate 81*a* contains the "cold" side of the heat exchanger, where the two hot exhaust streams (i.e., fuel and air exhaust streams from the stack) exit the heat exchanger 80 after giving up some of their heat and where two unheated air and fuel inlet streams enter heat exchanger.

However, any number of streams can flow through the heat exchanger, and any number of inlets and outlets may be used. In addition, hot and cold streams can enter through inlets in either end plate 81*a*, 81*b* and leave the heat exchanger through outlets in either end plate 81*a*, 81*b*.

Figure 8D:
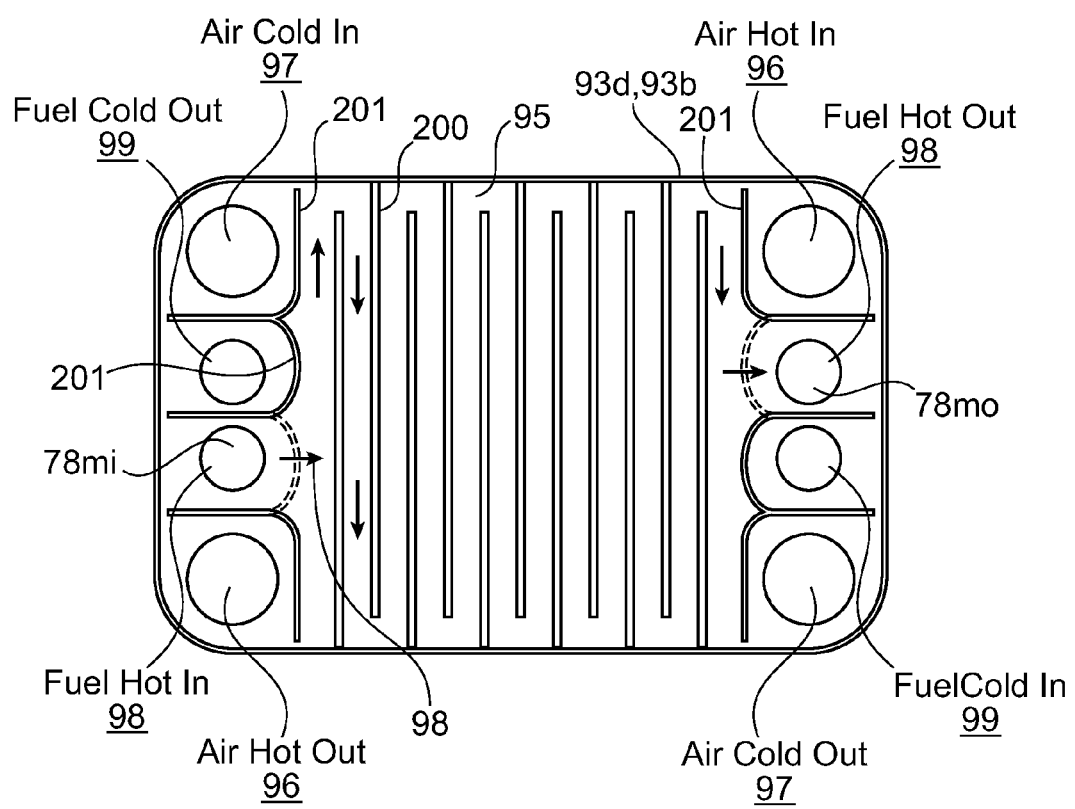

Each heat exchanger section 82, 83, 84 is comprised of at least two intermediate plates 93, although any number of plates 93 may be used within the sections and within the stack 80, as shown in FIG. 8A. The plates 93 are preferably rectangular, although they can be oval, circular, square, or any other shape. Each plate 93 has holes 94 located at each "short" end for a rectangular shaped plate. In an embodiment configured for four streams, eight holes 94 per plate 93 is preferable, with four holes located near one end of each plate and four holes located near the other end. However, plates may have any number of holes 94. The holes 94 form risers 78 when the plates 93, 81*a* and 81*b* are stacked together in the manner shown in FIG. 8A. Risers 78 run perpendicular to the plates 93 and streams flow through the risers 78 from one end plate 81*a* of the heat exchanger to the other end plate 81*b*. Each stream flows through two or more risers 78 (e.g., through one inlet riser and one outlet riser). The streams are contained within risers 78 by seals 201, as shown in FIGS. 8A and 8D. A dotted line indicates that the seal 201 is not present and fluid is dispersed in a flow path 95. A flow path 95 is the space between two stacked plates 93 (or between an intermediate plate 93 and an adjacent end plate 81*a* or 81*b*). In the flow paths 95, streams flow parallel to the plates 93 from one riser 78 to another. Along the flow path 95 is where heat exchange between streams takes place.

In one embodiment of the air preheater 82, cold air 97 (i.e., the air inlet stream to the stack) and hot fuel 98 (i.e., the fuel exhaust stream from the stack) exchange heat. The cold air 97 flows through a flow path 95 between plates 93*a* and 93*b*. In this preferred embodiment, the cold air 97 flows diagonally from one corner inlet riser 78*ci* to the diagonal corner outlet riser 78*ci*. In an adjacent flow path 95 on top of plate 93*b* (i.e., between plates 93*b* and 93*c*) in the air preheater 82, hot fuel 98 flows from a middle inlet riser 78*mi* to a middle outlet riser 78*mo* located diagonally across the plate 93*b*. Preferably, the diagonal directions of flows 97 and 98 are in the same direction but at a different angle. However, both the cold air 97 and the hot fuel 98 can flow from any riser 78 on one end of the plates to any riser 78 on the other end. The two streams exchange heat as they flow in the same general direction but on opposite sides of plate 93*b*.

In an embodiment of the fuel heat exchanger 83, cold fuel 99 (i.e., the fuel inlet stream to the stack) exchanges heat with hot fuel 98 (i.e., the fuel exhaust stream from the stack). The cold fuel 99 flows through a flow path 95 from a middle inlet riser 78*ni* to another middle outlet riser 78*no* located diagonally across the plate 93*c* (i.e., the path is located between plates 93*c* and 93*d*). In an adjacent flow path 95 between plates 93*d* and 93*e*, hot fuel 98 also flows from middle riser 78*mi* to a diagonal middle riser 78*mo* in roughly opposite (i.e., counterflow) direction of the cold fuel 99. As shown in FIG. 8A, the hot fuel 98 heats the cold fuel 99 at the same time as the hot fuel 98 heats the cold air 97. The cold fuel 99 is heated by two hot fuel 98 flows: the first hot fuel 98 flow between plates 93*b* and 93*c* and the second hot fuel 98 flow between plates 93*d* and 93*e*. Likewise, the first hot fuel 98 flow between plates 93*b* and 93*c* heats both the cold air flow 97 in the air preheater 82 and the cold fuel flow in the fuel heat exchanger 83. However, both the cold fuel 99 and hot fuel 98 could flow from any riser 78 on one end of the plates 93 to any riser 78 on the other end.

In an embodiment of the air heat exchanger 84, cold air 97 (i.e., the air inlet stream to the fuel cell stack) exchanges heat with hot air 96 (i.e., the air exhaust stream from the fuel cell stack). The cold air 97 flows across a diagonal flow path 95 from a corner riser 78*ci* to a diagonal corner riser 78*co* between plates 93*e* and 93*f*. Hot air 96 flows in an adjacent diagonal flow path 95 between plates 93*f* and 81*a* from a corner riser 78*di* to a diagonal corner riser 78*do*. Preferably, cold air 97 and hot air 96 flow in roughly opposite (i.e., counterflow) directions. Thus, the cold air 97 is heated by both the hot air 96 and by the hot fuel 98 in the path between plates 93*d* and 93*e*. Preferably, cold air 97 and hot fuel 98 flow in roughly the same (i.e., co-flow) directions. As in the other sections, the cold air 97 and the hot air 96 could each flow from any riser 78 on one end of the plates to any riser 78 on the other end.

FIG. 8D shows one embodiment of the flow of hot fuel 98 through a flow path 95 above a plate, such as a plate 93*b* or 93*d*. The hot fuel 98 exits a middle riser 78*mi* and flows into the flow path 95. The hot fuel 98 is able to enter the flow path 95 between the plates because there is no seal 201 to contain the stream in the riser 78*mi*. The other risers on the left side of the plate 93 are sealed by seals 201. The path is lengthened by optional interdigitated ribs 200 in plate 93, as shown in FIG. 8D. The ribs 200 provide a zig-zag path 95. Other rib configurations may be used. The hot fuel 98 flows back and forth between the ribs 200, and exits the flow path 95 on the opposite end of the plate by entering the "fuel hot out" middle riser 78*mo*. The other risers on the right side of the plate are sealed by seals 201.

Figure 8E:
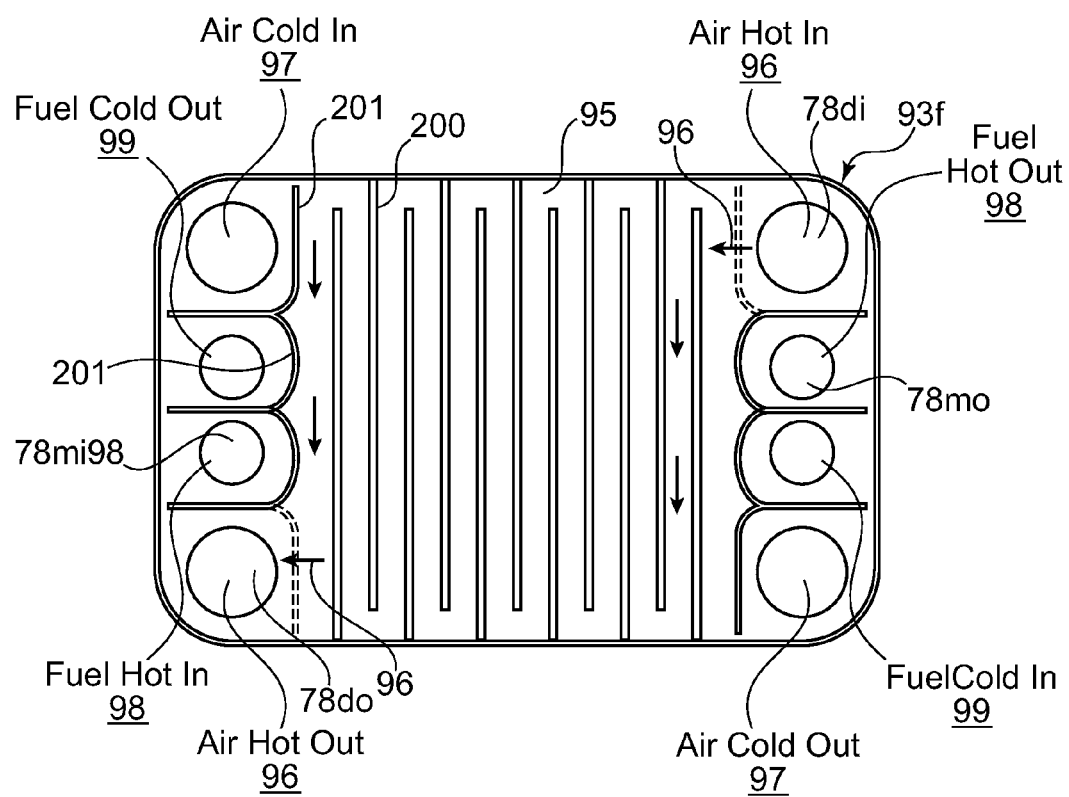

FIG. 8E shows one embodiment of the flow of hot air 96 through a flow path 95 above a plate, such as a plate 93*f*. The hot air 96 exits a corner riser 78*di* and flows into the flow path 95. The hot air 96 is able to enter the flow path 95 between the plates because there is no seal 201 to contain the stream in the riser 78*di*. The other risers on the right side of the plate 93*f* are sealed by seals 201. The path is lengthened by optional interdigitated ribs 200 in plate 93, as shown in FIG. 8E. The ribs 200 provide a zig-zag path 95. Other rib configurations may be used. The hot air 96 flows back and forth between the ribs 200, and exits the flow path 95 on the opposite end of the plate by entering the "fuel hot out" opposite corner riser 78*do*. The other risers on the left side of the plate are sealed by seals 201.

Figure 9A:
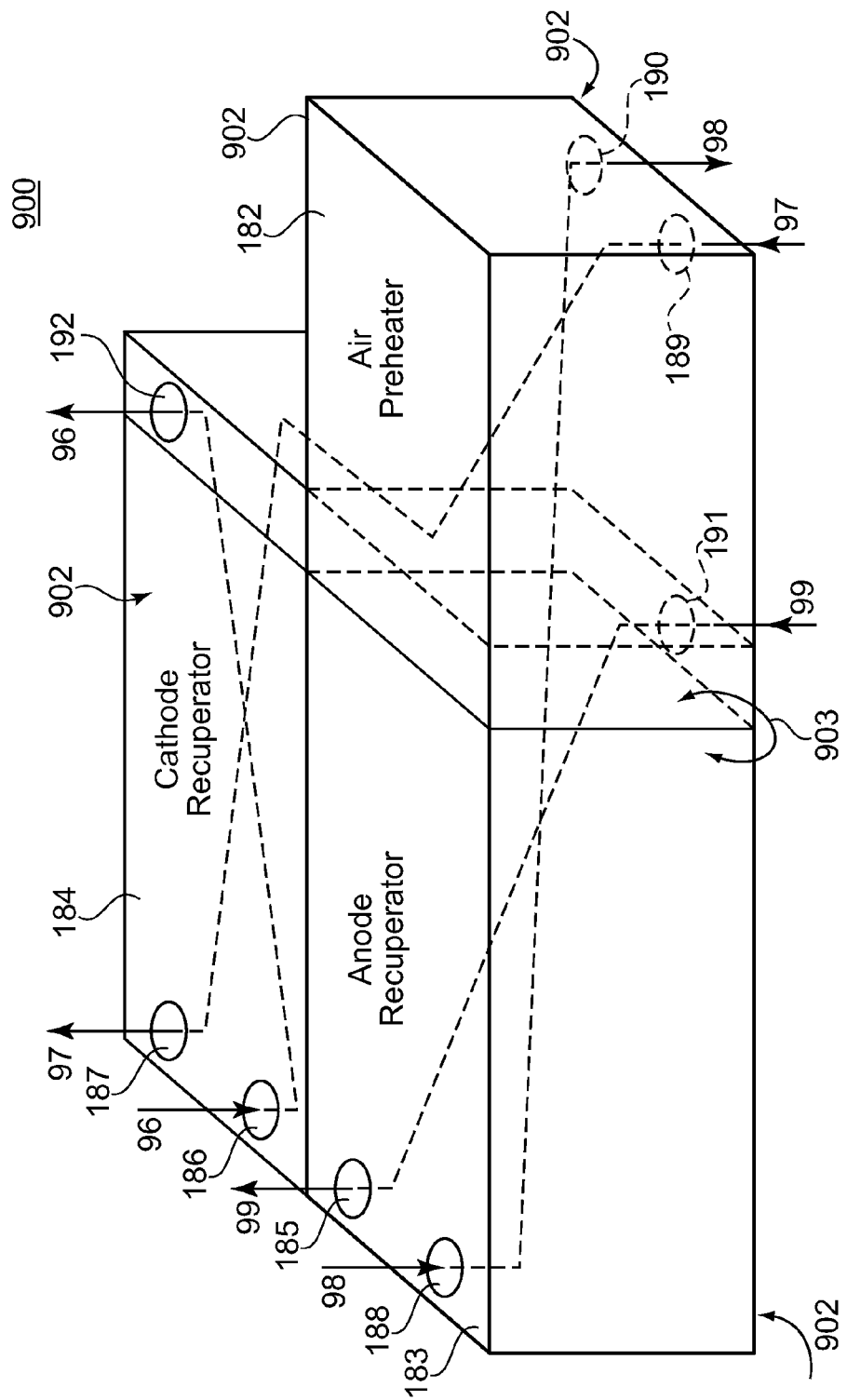
FIG. 9A is a schematic three dimensional view of a multi-stream plate heat exchanger of another embodiment of the invention.

FIG. 9A shows another embodiment of a plate type multi-stream heat exchanger configuration 900. Here, the thermal gradient is principally parallel to the plates. Many of the features are similar to those of multi-stream heat exchanger 80. This configuration is also comprised of three heat exchange sections, including an air preheater 182, an anode recuperator section 183, and a cathode recuperator section 184. The "anode recuperator section" 183 corresponds to the fuel heat exchanger 83, and the "cathode recuperator section" 184 corresponds to the air heat exchanger 84. The air preheater 182 can optionally be built as a separate exchanger to mitigate thermal expansion issues, reduce heat exchange footprint, or reduce scrap from plate raw material. If so, the air preheater can be made of a cheaper material.

Each heat exchanger section has two major surfaces 902, illustrated in FIG. 9A as the top and bottom of each section, and a plurality of edge surfaces 903. In this embodiment, the major surfaces 902 of each heat exchanger section are substantially parallel to the major surfaces 902 of the other heat exchanger sections. Preferably, the air preheater section 182 is located adjacent to a first edge surface 903 of the anode recuperator section 183. In addition, the cathode recuperator section 184 is located adjacent to a second edge surface 903 of the anode recuperator section 183. The first and second edge surfaces 903 are preferably adjacent to each other. However, the air preheater section 182 and the cathode recuperator section 184 may be located adjacent to any surface of the anode recuperator 183 and form any angle with respect to each other. In another embodiment, the air preheater 182 may be located underneath the anode recuperator 183 or the cathode recuperator 184. In addition, each major surface 902 and each edge surface 903 of the sections may be any shape including triangular, square, rectangular, trapezoidal, pentagonal, etc. The overall shapes and sizes of each section can also vary with respect to the other sections. For example, the air preheater 182 may have the same, larger or smaller width than the anode recuperator 183. Likewise, the cathode recuperator 184 may have the same, larger or smaller length than the anode recuperator 183. If desired, the air preheater 182 may be rotated 90 degrees (counter clockwise in FIG. 9B) to reduce its length. In that case, insulation should be added between the air preheater 182 and the cathode recuperator 184. A trapezoid shaped plate with the wider parallel side of the trapezoid at the hot end would allow for more constant velocities as the gas expands on heating or contracts on cooling. More constant velocities would help to maintain reasonable film heat transfer coefficients throughout the exchanger without excessive pressure drop due to high velocities.

FIG. 9A also illustrates the streams that enter and exit the multi-stream heat exchanger 900 of this embodiment. The air inlet stream 97, previously referred to as "cold air," enters through an inlet 189 and travels through the air preheater 182. In this embodiment, the stream then flows roughly horizontally from the air preheater 182 to the cathode recuperator 184. The term roughly horizontally includes the vertical component of each section of the heat exchanger if the steam enters one major surface 902 and exits in the opposite major surface 902 of the heat exchanger. In other embodiments, the air inlet stream 97 might also flow through risers within the air preheater 182 and the cathode recuperator 184 as it travels from one section to the other. The air inlet stream 97 then travels from one end of the cathode recuperator 184 to the other, and exits the exchanger 900 through outlet 187. Preferably stream 97 enters in one major surface (e.g., the bottom major surface) 902 and exits in the opposite major surface (e.g., the top major surface) 902.

The anode exhaust stream 98, previously termed "hot fuel," enters the heat exchanger 900 through an inlet 188. It then flows from one end of the anode recuperator section 183 to the other, and continues to flow through the air preheater 182. Alternatively, a portion of the anode exhaust may be withdrawn via optional fuel outlet 199 prior to passing to the air preheater, as shown in FIGS. 2C and 9C. In the air preheater section 182, the anode exhaust stream 98 exchanges heat with the air inlet stream 97. Stream 98 exits via outlet 190. Preferably stream 98 enters in one major surface (e.g., the top major surface) 902 and exits in the opposite major surface (e.g., the bottom major surface) 902. In the anode recuperator section 183, the anode exhaust stream 98 exchanges heat with the fuel inlet stream 99, or "cold fuel." The fuel inlet stream 99 enters the heat exchanger 900 through an inlet 191. It travels through the anode recuperator section 183 in the opposite direction of the anode exhaust stream 98, and exits the exchanger through outlet 185. Preferably stream 99 enters in one major surface (e.g., the bottom major surface) 902 and exits in the opposite major surface (e.g., the top major surface) 902.

The cathode exhaust stream 96, or "hot air," enters the heat exchanger 900 through inlet 186. It then travels through the cathode recuperator section 184 and exchanges heat with the air inlet stream 97. The cathode exhaust stream exits the exchanger 900 through outlet 192. While outlet 192 is shown in the top major surface 902 for clarity of illustration, preferably outlet 192 is located in the bottom major surface 902 of the heat exchanger. Thus, preferably stream 96 enters in one major surface (e.g., the top major surface) 902 and exits in the opposite major surface (e.g., the bottom major surface) 902.

In this embodiment, all of the inlets and outlets are located near corners of the major surfaces 902 of each section. However, the inlets and outlets may be located on any major surface 902 and/or edge surface 903 that provides access to risers 78 (vertical flow distribution tubes pictured in FIGS. 9D and 9E). It is preferable for the cathode exhaust 96 and the anode exhaust 98 streams (e.g., the "hot streams") to enter through a major surface 902 (e.g., the top major surface) on one side of the heat exchanger 900 and for the air inlet stream 97 and the fuel inlet stream 99 to enter through the major surface 902 on the other side of the heat exchanger (e.g., the bottom major surface). In this configuration, insulation might be thicker at the hotter side (e.g., the top side) of the exchanger 900 than on the colder side (e.g., the bottom side) of the heat exchanger. Preferably, the hot streams 96 and 98 also enter on the same hot side (e.g., the left side) and exit on the same cold side (e.g., the right side) of the heat exchanger, while the cold stream 97 enters on the cold side and exits on the hot side. Cold stream 99 enters the heat exchanger in the middle (e.g., at the cold edge of section 183) and exits on the hot side.

Each section of the heat exchanger 900 can have three plates 93, although any number of plates is possible. As described above in the single stack embodiment 80, the plates 93 can be any shape and size and can have any number of holes 94. When stacked together, the holes in the plates form risers 78. Furthermore, the exchanger 900 can have any number of risers 78 within each section. The risers 78 may have the same or different sizes compared to each other.

Figure 9B:
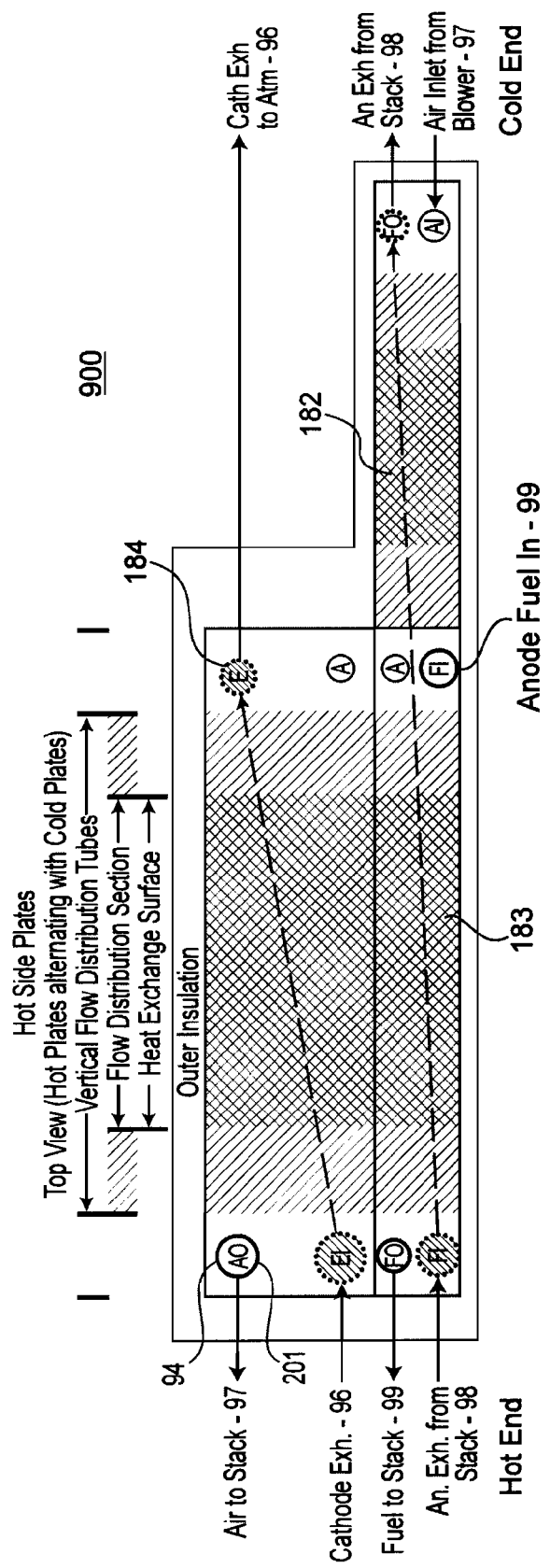
FIGS. 9B and 9C are top views of the heat exchanger of FIG. 9A.
Figure 9C:
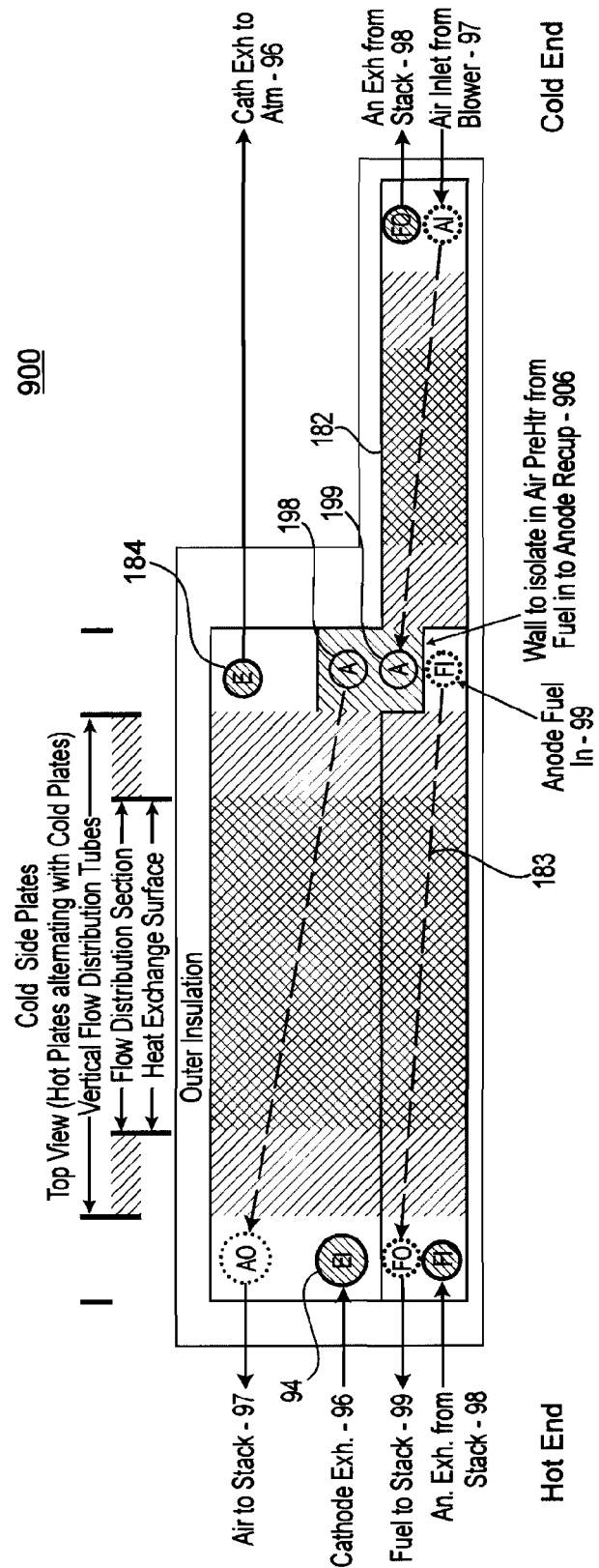

FIGS. 9B and 9C are top views of the multi-stream heat exchanger 900 at two different cross sectional planes. FIG. 9B shows an embodiment of a flow path of the cathode exhaust stream 96 and anode exhaust stream 98 (i.e., the hot streams). Dotted lines on vertical risers 78 indicate a stream is dispersed on that layer. Solid lines on vertical risers 78 indicate a seal 201 is preventing the fluid from the stream from being dispersed. The anode exhaust 98 enters a flow path of the anode recuperator 183 from riser FI and travels diagonally across the anode recuperator 183. The anode exhaust stream 98 may optionally flow through risers 78 as it travels from the anode recuperator section 183 to the air preheater section 182. The stream continues to flow diagonally across the air preheater 182. The anode exhaust 98 then exits the exchanger 900 through outlet 190 (outlets shown in FIG. 9A). The cathode exhaust 96 enters the flow path from riser E1 of the cathode recuperator 184 and flows diagonally across the cathode recuperator 184. It enters riser E, and exits the exchanger 900 through outlet 192.

FIG. 9C shows one embodiment of a flow path of the air inlet stream 97 and fuel inlet stream 99 (i.e., the cold streams). The air inlet stream 97 enters a flow path from riser AI of the air preheater 182 and flows diagonally across the air preheater 182. The stream then flows parallel to the plates 93 to the cathode recuperator 184. The stream 97 may flow through optional air redistribution holes 198, 199 between the air preheater 182 and the cathode recuperator 184 before entering the cathode recuperator 184. After diagonally crossing the cathode recuperator 184, the air inlet stream 97 enters riser AO, and exits the exchanger through outlet 187. In the flow diagram shown in FIG. 2C, where a portion of the fuel exhaust stream is provided to the ATO, one of optional air redistribution holes 199 is instead used as a fuel outlet to provide the anode exhaust to the ATO. The fuel inlet stream 99 enters the flow path in the anode recuperator 183 from riser FI. It then travels diagonally across the anode recuperator, enters riser FO, and exits the exchanger 900 through outlet 185. All streams might flow from one end of a section to the other between only one pair of plates 93 or between several pairs of plates 93. The heat exchange surface on each plate may be plate and fin or corrugated with a chevron or other type of pattern.

Figure 9D:
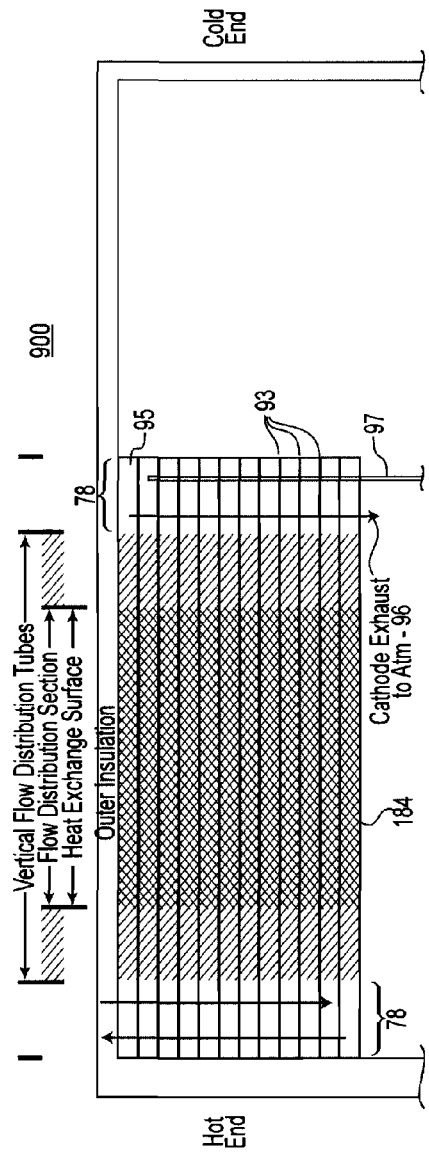
FIGS. 9D and 9E are side cross sectional views of the heat exchanger of FIG. 9A.
Figure 9E:
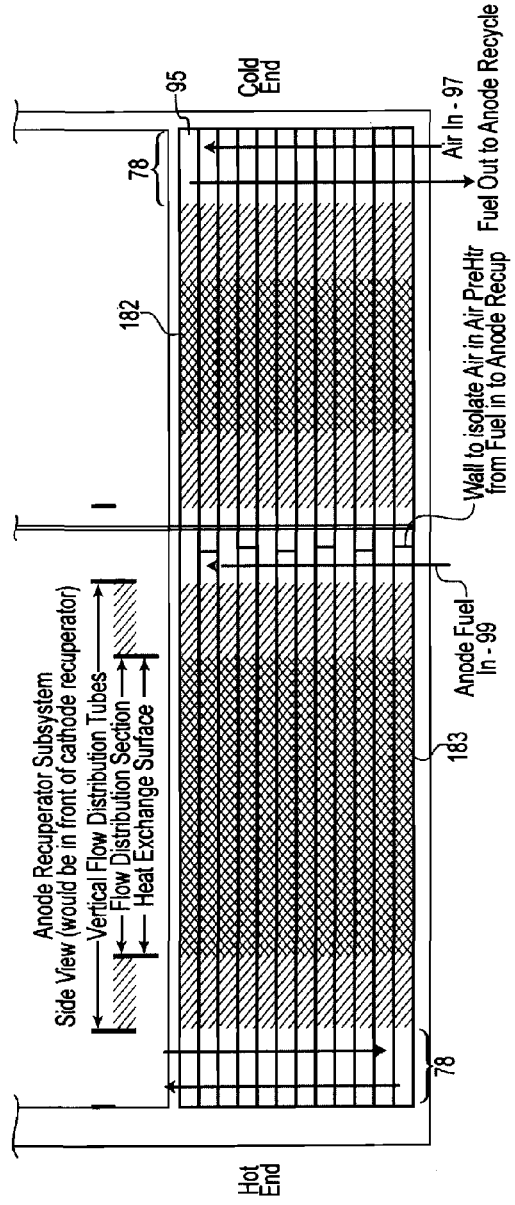

FIGS. 9D and 9E illustrate a side view of the heat exchanger 900. FIG. 9D is the cathode recuperator section 184 and is located behind the anode recuperator section 183. Each of the four streams flows through the risers 78 for distribution into the flow paths. There may be any number of risers 78, which can be of any shape and size (e.g., one or a plurality of risers may carry each stream). The risers may also incorporate any number of techniques to create more uniform flow, such as channels, baffles, vanes, etc. The vertical distribution pipes or risers between the air preheater 182 and the cathode recuperator 184 for air inlet stream flow are optional. Likewise, optional vertical distribution pipes or risers may be added between the air preheater 182 and the anode recuperator 183 for the anode exhaust stream flow.

In a preferred embodiment, a wall separates the flow path of the air inlet stream 97 in sections 182 from that of the fuel inlet stream 99 in section 183. This and other walls between sections may be formed of multiple layers, allowing for small gaps filled with air or insulation. This configuration reduces heat flow/leak between sections. Furthermore, as shown in FIGS. 9D and 9E, the heat exchange surfaces of each section 182, 183, 184 are bounded by flow distribution sections which are in turn bounded by the flow distribution tubes or risers 78. The outer insulation of the heat exchanger is also shown in these figures.

Figure 10:
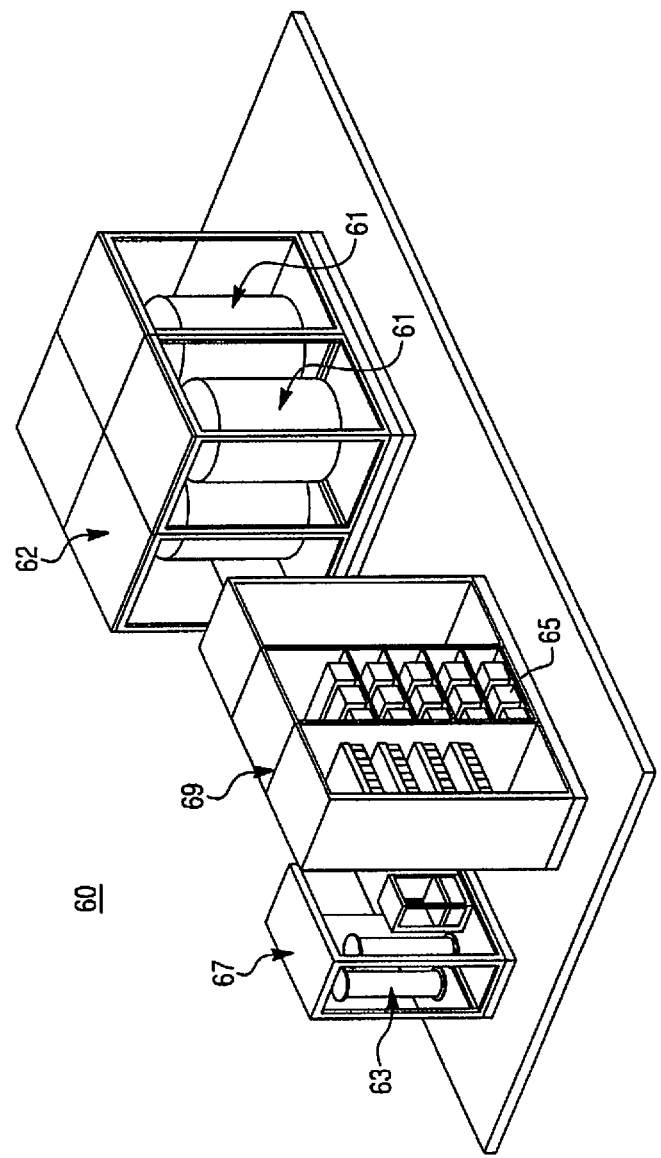
FIG. 10 is a schematic three dimensional view of a modular fuel cell system according to one embodiment of the invention.

Another embodiment of the invention provides a modular design for the entire fuel cell system rather than just for the fuel cell stack modules. The modular system design provides flexible installation and operation. Modules allow scaling of installed generating capacity, reliable generation of power, flexibility of fuel processing, and flexibility of power output voltages and frequencies with a single design set. The modular design results in an "always on" unit with very high availability and reliability. This design also provides an easy means of scale up and meets specific requirements of customer's installations. The modular design also allows the use of available fuels and required voltages and frequencies which may vary by customer and/or by geographic region. Thus, in summary, since the fuel cell system is designed as a modular set, it can be installed to accommodate the requirements of different customers and the elements of the system are able to work in concert to achieve a very high system reliability and availability. FIG. 10 shows an exemplary configuration of the modular fuel cell system 60. The system 60 includes the following elements. The system 60 includes a plurality of fuel cell stack modules 61. These modules 61 are devices which contain the components used for generating DC power from a readily reformed fuel stream.

In one aspect of the second embodiment, each fuel cell stack module 61 is the same as the module 1 of the first embodiment. Thus, each module 61 shown in FIG. 10 may comprise a base 3, a shell 11 and one or more fuel cell stacks 9, as shown in FIG. 1B. For example, for a high temperature fuel cell system, such as a SOFC or a molten carbonate fuel cell system, each fuel cell stack module 61 is the same as the module 1 of the first embodiment. In an alternative aspect of the second embodiment, each module 61 may comprise one base 3 and a plurality of fuel cell stacks 9 covered by a plurality of shells 11. Alternatively, each module 61 may have a different structure or configuration from the modules 1 of the first embodiment. For example, for low temperature fuel cell systems, such as PEM systems, each module 61 can be different from the module 1 of the first embodiment. Thus, the system of the second embodiment is applicable to high and low temperature fuel cell stack modules.

Each module 61 contains at least one fuel cell stack 9. Multiple fuel cell stack modules 61 may be installed in a clustered installation, such as for example, in a single hot box 62. A failure of a single fuel cell stack module 61 results only in a slightly degraded output capacity or slightly degraded system efficiency because the remaining fuel cell stack modules 61 continue operation.

The system 60 also contains one or more fuel processing modules 63. These modules are devices which contain the components used for pre-processing of fuel so that it can be readily reformed. The fuel processing modules 61 may be designed to process different sets of fuels. For example, a diesel fuel processing module, a natural gas fuel processing module, and an ethanol fuel processing module may be provided. The processing modules 63 may processes at least one of the following fuels selected from natural gas from a pipeline, compressed natural gas, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, the reformer 37 may be located in the fuel processing module 63. Alternatively, if it is desirable to thermally integrate the reformer 37 with the fuel cell stack(s) 9, then the reformer(s) 37 may be located in the fuel cell stack module(s) 61. Furthermore, if internally reforming fuel cells are used, then the external reformer 37 may be omitted entirely. Alternatively, reformation could be done in any combination of the above mentioned locations.

The system 60 also contains one or more power conditioning modules 65. These modules 65 are devices which contain the components for converting the DC power to AC power, connecting to the grid, and managing transients. The power conditioning modules 65 may be designed convert the DC power from the fuel cell modules 61 to different AC voltages and frequencies. Designs for 208V, 60 Hz; 480V, 60 Hz; 415V, 50 Hz and other common voltages and frequencies may be provided. For example, each module 65 may contain a dedicated DC/DC converter unit for each pair of stacks 9 in a fuel cell module 61 and a common DC/AC converter unit for the plural DC/DC converter units of each module 65.

Each type of module 61, 63, 65 may be installed in or on a separate container, such as a box, rack or platform. Thus, the containers may be located separately from each other, and may be moved, repaired or serviced separately. For example, as shown in FIG. 10, the fuel cell stack modules 61 are located in a common hot box 62. The fuel processing module or modules 63 may be located in a separate box 67. The power conditioning module or modules 65 may be located on a separate rack 69.

The fuel cell systems described herein may have other embodiments and configurations, as desired. Other components may be added if desired, as described, for example, in U.S. application Ser. No. 10/300,021, filed on Nov. 20, 2002, in U.S. application Ser. No. 11/656,006 filed on Jan. 22, 2007, in U.S. Provisional Application Ser. No. 60/461,190, filed on Apr. 9, 2003, and in U.S. application Ser. No. 10/446,704, filed on May 29, 2003 all incorporated herein by reference in their entirety. Furthermore, it should be understood that any system element or method step described in any embodiment and/or illustrated in any figure herein may also be used in systems and/or methods of other suitable embodiments described above, even if such use is not expressly described.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A method of operating a fuel cell system, comprising:
    providing a fuel inlet stream and an air inlet stream into a fuel cell stack;
    providing a cathode exhaust stream from the fuel cell stack into an anode tail gas oxidizer;
    providing an anode exhaust stream from the fuel cell stack into an anode recuperator to heat the fuel inlet stream;
    splitting the anode exhaust stream after it exits the anode recuperator into a first anode exhaust stream and a second anode exhaust stream;
    providing the first anode exhaust stream into the anode tail gas oxidizer;
    providing the second anode exhaust stream directly into an air preheater to preheat the air inlet stream followed by recycling the second anode exhaust stream into the fuel inlet stream;
    providing an anode tail gas oxidizer exhaust stream into a cathode recuperator to heat the air inlet stream followed by providing the anode tail gas oxidizer exhaust stream to a steam generator to generate steam; and
    providing the steam into the fuel inlet stream,
    wherein the anode exhaust stream is split upstream of the air preheater in a splitter located in a hot box containing the fuel cell stack, and the first anode exhaust stream is provided directly from the splitter into the anode tail gas oxidizer without passing through the air preheater or outside the hot box.

2. The method of claim 1, wherein the fuel cell stack comprises a solid oxide fuel cell stack and the fuel inlet stream comprises a hydrocarbon fuel inlet stream.

3. The method of claim 2, further comprising partially reforming the fuel inlet stream prior to providing the fuel inlet stream into the fuel cell stack and internally reforming the fuel inlet stream in the fuel cell stack.

4. The method of claim 1, wherein:
    the cathode exhaust stream comprises a sole source of air for the anode tail gas oxidizer and the anode tail gas oxidizer lacks a separate air inlet; and
    the first anode exhaust stream comprises an entire source of fuel for the anode tail gas oxidizer and separate fresh fuel is not provided into the anode tail gas oxidizer.

5. The method of claim 1, further comprising controlling the air inlet stream to control and maintain the fuel cell stack temperature and the anode tail gas oxidizer temperature.

6. The method of claim 1, further comprising controlling an amount of anode exhaust stream in the first and the second fuel exhaust streams by using at least one of a variable speed blower and a control valve to control an amount of second anode exhaust stream being recycled into the fuel inlet stream.

* * * * *